(12) United States Patent
Kehoe

(10) Patent No.: US 9,702,153 B2
(45) Date of Patent: Jul. 11, 2017

(54) ACCESSORY FOR A RECIPROCATING SAW

(71) Applicant: Milwaukee Electric Tool Corporation, Brookfield, WI (US)

(72) Inventor: Sean T. Kehoe, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 687 days.

(21) Appl. No.: 13/762,889

(22) Filed: Feb. 8, 2013

(65) Prior Publication Data
US 2013/0239418 A1 Sep. 19, 2013

Related U.S. Application Data

(60) Provisional application No. 61/597,538, filed on Feb. 10, 2012, provisional application No. 61/597,525, (Continued)

(51) Int. Cl.
*E04F 21/00* (2006.01)
*B23D 61/12* (2006.01)
(Continued)

(52) U.S. Cl.
CPC ........ *E04F 21/0084* (2013.01); *B23D 61/123* (2013.01); *B23D 61/18* (2013.01); *B28D 1/26* (2013.01); *B27B 19/00* (2013.01)

(58) Field of Classification Search
CPC ........ B26B 21/20; B26B 21/22; B26B 21/18; B26B 21/56; B27B 5/07; B27B 19/006;
(Continued)

(56) References Cited

U.S. PATENT DOCUMENTS 304,715 A 9/1884 Emerson
511,473 A 12/1893 Szekely
(Continued)

FOREIGN PATENT DOCUMENTS

DE 3838844 5/1990
DE 4316454 11/1994
(Continued)

OTHER PUBLICATIONS

"How-To's for all Band Saw Blades" The Olson Saw Company, Betherl, CT © 2001.
(Continued)

*Primary Examiner* — Jason Daniel Prone
*Assistant Examiner* — Richard Crosby, Jr.
(74) *Attorney, Agent, or Firm* — Michael Best & Friedrich LLP

(57) ABSTRACT

A reciprocating power tool including a housing supporting a motor having a drive shaft, a blade clamp mechanism, and a drive mechanism. The drive clamp mechanism is coupled to the motor for converting rotational motion of the drive shaft into reciprocating motion of the blade clamp mechanism. The power tool includes an accessory having an attachment portion coupled to the blade clamp mechanism, and a body portion extending from the attachment portion. A grout rake is coupled to the body portion and includes a plurality of cutter portions. The grout rake is repositionable relative to the body portion between a first position and a second position. In the first position one of the plurality of cutter portions is located in a working position for contacting a workpiece, and in the second position another one of the plurality of cutter portions is located in the working position for contacting the workpiece.

39 Claims, 23 Drawing Sheets

Related U.S. Application Data filed on Feb. 10, 2012, provisional application No. 61/597,532, filed on Feb. 10, 2012, provisional application No. 61/597,535, filed on Feb. 10, 2012, provisional application No. 61/605,445, filed on Mar. 1, 2012, provisional application No. 61/605,682, filed on Mar. 1, 2012.

(51) Int. Cl.
*B23D 61/18* (2006.01)
*B28D 1/26* (2006.01)
*B27B 19/00* (2006.01)

(58) Field of Classification Search
CPC .... B27B 3/00; B27B 3/02; B27B 3/04; B27B 3/06; B27B 3/08; B23D 49/10; B23D 51/10
USPC ............. 30/392–394, 351, 353, 355, 346.57, 30/501–503; 13/392–394, 351, 353, 355, 13/346.57
See application file for complete search history.

(56) References Cited

U.S. PATENT DOCUMENTS

| | | | |
|---|---|---|---|
| 522,749 A | 7/1894 | Bedell | |
| 709,857 A | 9/1902 | Anderson | |
| 770,094 A | 9/1904 | McGill | |
| 807,227 A | 12/1905 | Wuest | |
| 865,348 A | 9/1907 | Allison | |
| 942,920 A | 12/1909 | Martin | |
| 2,256,847 A | 9/1941 | Osenberg | |
| D170,202 S | 8/1953 | Knapp | |
| 2,781,578 A | 2/1957 | Guilfoyle | |
| 2,962,798 A | 12/1960 | Gaskins | |
| 3,005,478 A | 10/1961 | Laviano | |
| 3,028,889 A | 4/1962 | McCarthy | |
| 3,003,251 A | 5/1962 | Atkinson et al. | |
| 3,213,910 A | 10/1965 | Corlise | |
| 3,262,475 A | 7/1966 | Sweet | |
| 3,285,136 A | 11/1966 | Ritter et al. | |
| 3,395,414 A | 8/1968 | Malin | |
| 3,572,409 A | 3/1971 | Hoffman | |
| 3,596,525 A | 8/1971 | Niesz | |
| 3,680,610 A | 8/1972 | Lindgren | |
| 3,727,258 A | 4/1973 | Brueck | |
| 3,837,024 A | 9/1974 | Saunders | |
| 3,905,105 A | 9/1975 | Tuke | |
| 3,914,906 A | 10/1975 | Barnes | |
| 3,977,289 A * | 8/1976 | Tuke | 83/835 |
| 4,083,112 A * | 4/1978 | Palm | 30/335 |
| 4,131,996 A | 1/1979 | Janke | |
| 4,271,592 A | 6/1981 | Hoptner | |
| 4,339,977 A | 7/1982 | Miller | |
| 4,365,397 A | 12/1982 | Felpel | |
| 4,661,195 A * | 4/1987 | Hopson | 156/709 |
| 4,787,146 A | 11/1988 | Gaskins | |
| 4,802,396 A | 2/1989 | Kuklinski | |
| 4,870,757 A | 10/1989 | Kirkpatrick et al. | |
| 4,984,369 A | 1/1991 | Flint et al. | |
| 5,009,012 A | 4/1991 | Martinez et al. | |
| 5,042,592 A | 8/1991 | Fisher | |
| 5,095,623 A | 3/1992 | Williams | |
| 5,097,578 A | 3/1992 | Jandl | |
| 5,224,231 A | 7/1993 | Nacar | |
| 5,265,340 A * | 11/1993 | Nitz et al. | 30/166.3 |
| 5,295,426 A | 3/1994 | Planchon | |
| 5,303,471 A | 4/1994 | Liberatoscioli | |
| 5,353,465 A | 10/1994 | Pierce et al. | |
| D356,020 S | 3/1995 | Costa | |
| 5,398,360 A | 3/1995 | Alexander | |
| 5,448,833 A | 9/1995 | Coon | |
| 5,480,507 A | 1/1996 | Arnold | |
| 5,513,709 A | 5/1996 | Fisher | |
| 5,517,889 A | 5/1996 | Logan | |
| 5,640,772 A | 6/1997 | Roker et al. | |
| 5,658,193 A | 8/1997 | McCambridge | |
| 5,678,292 A | 10/1997 | Kimbel et al. | |
| 5,687,484 A | 11/1997 | Hahn | |
| 5,697,835 A * | 12/1997 | Nitz et al. | 451/548 |
| 5,809,657 A * | 9/1998 | Mortensen | B23D 49/11 30/122 |
| 5,829,082 A | 11/1998 | Moreira | |
| 5,833,014 A | 11/1998 | Dunn | |
| D402,516 S | 12/1998 | Okada | |
| 5,842,278 A | 12/1998 | Gmeilbauer | |
| 5,901,451 A | 5/1999 | Nakayama | |
| 5,901,951 A * | 5/1999 | Yamaguchi | 271/10.11 |
| 5,918,525 A | 7/1999 | Schramm | |
| 5,957,765 A | 9/1999 | Kimbel et al. | |
| 5,964,039 A | 10/1999 | Mizoguchi et al. | |
| 5,979,058 A | 11/1999 | Henke | |
| 6,021,573 A | 2/2000 | Kikuchi et al. | |
| 6,059,475 A | 5/2000 | Jafarmadar | |
| D427,865 S | 7/2000 | Mills, Jr. | |
| 6,120,363 A | 9/2000 | Dunn | |
| 6,125,544 A | 10/2000 | Eriksson et al. | |
| 6,145,426 A | 11/2000 | Ward et al. | |
| 6,149,510 A * | 11/2000 | Romagnoli | 451/356 |
| D442,053 S | 5/2001 | Jimenez | |
| 6,237,179 B1 | 5/2001 | Balceiro | |
| 6,260,825 B1 | 7/2001 | Willis | |
| 6,283,843 B1 * | 9/2001 | Romagnoli | 451/523 |
| D448,634 S | 10/2001 | Hickman | |
| 6,357,122 B2 | 3/2002 | Bachta | |
| 6,393,701 B1 | 5/2002 | Fuchs et al. | |
| 6,401,585 B1 | 6/2002 | Morgan | |
| 6,442,781 B1 | 9/2002 | Chen | |
| 6,481,691 B1 | 11/2002 | Irving | |
| 6,497,046 B1 | 12/2002 | Bardeen et al. | |
| D479,107 S | 9/2003 | Rack | |
| D479,447 S | 9/2003 | Rack | |
| D482,945 S | 12/2003 | Grolimund | |
| 6,668,463 B2 | 12/2003 | Dewberry | |
| D484,759 S | 1/2004 | Rack | |
| D485,140 S | 1/2004 | Rack | |
| D485,141 S | 1/2004 | Rack | |
| D485,142 S | 1/2004 | Rack | |
| D485,479 S | 1/2004 | Rack | |
| 6,678,959 B1 * | 1/2004 | Phillip et al. | 30/277.4 |
| 6,751,875 B2 | 6/2004 | Jones | |
| 6,754,967 B2 * | 6/2004 | Lovell et al. | 30/517 |
| D493,340 S | 7/2004 | Pyatt | |
| 6,782,781 B2 | 8/2004 | Rack | |
| 6,829,973 B1 | 12/2004 | Yang | |
| 6,871,405 B2 * | 3/2005 | Reale et al. | 30/392 |
| 6,886,261 B2 | 5/2005 | Haut | |
| 6,887,139 B2 | 5/2005 | Jennette | |
| 6,938,531 B2 | 9/2005 | Yoshimizu | |
| 7,036,415 B2 | 5/2006 | Tsujimoto | |
| 7,127,979 B2 | 10/2006 | Kocher et al. | |
| D534,401 S | 1/2007 | Duffin et al. | |
| 7,232,112 B2 | 6/2007 | Foster | |
| 7,251,895 B2 | 8/2007 | Kurtz et al. | |
| 7,269,867 B2 | 9/2007 | Karlstedt | |
| D551,923 S | 10/2007 | Ammann | |
| 7,285,038 B1 * | 10/2007 | Jioia | 451/28 |
| D554,452 S | 11/2007 | Ammann | |
| D555,444 S | 11/2007 | Ammann | |
| D565,369 S | 4/2008 | Dawson | |
| 7,451,677 B2 | 11/2008 | Souza et al. | |
| 7,487,704 B2 | 2/2009 | Souza et al. | |
| 7,540,091 B2 | 6/2009 | Fladgard et al. | |
| 7,600,458 B2 | 10/2009 | Hampton et al. | |
| 7,631,584 B2 | 12/2009 | Quinn | |
| 7,661,195 B1 | 2/2010 | Wood et al. | |
| 7,765,631 B2 | 8/2010 | Fisher | |
| 7,779,500 B1 | 8/2010 | Greer | |
| 7,818,887 B2 | 10/2010 | Saegesser et al. | |
| 7,984,914 B1 | 7/2011 | Paulsen | |
| 8,365,419 B2 * | 2/2013 | Bernardi et al. | 30/371 |
| 8,926,410 B2 * | 1/2015 | Kalomeris et al. | 451/356 |
| 2001/0039738 A1 | 11/2001 | Bachta | |

(56) References Cited

U.S. PATENT DOCUMENTS

| | | |
|---|---|---|
| 2002/0029484 A1 | 3/2002 | Takeuchi |
| 2002/0144411 A1* | 10/2002 | Brooks .................. B23D 51/10 30/392 |
| 2003/0014836 A1 | 1/2003 | Kocher et al. |
| 2003/0014869 A1 | 1/2003 | Rack |
| 2003/0177646 A1* | 9/2003 | Watanabe ....................... 30/392 |
| 2004/0163264 A1 | 8/2004 | Simonz |
| 2004/0187320 A1 | 9/2004 | Haut |
| 2004/0221405 A1 | 11/2004 | Manfredi |
| 2005/0199117 A1* | 9/2005 | Quinn ....................... 83/698.11 |
| 2005/0211023 A1 | 9/2005 | Kalo |
| 2005/0235799 A1* | 10/2005 | Hampton et al. ............... 83/835 |
| 2005/0262702 A1 | 12/2005 | Hawthorn |
| 2005/0262709 A1 | 12/2005 | Polk, Sr. |
| 2006/0016315 A1 | 1/2006 | Zorich et al. |
| 2006/0037199 A1 | 2/2006 | Alpert |
| 2006/0086218 A1* | 4/2006 | Quinn ............................... 83/13 |
| 2006/0112566 A1 | 6/2006 | Peterson et al. |
| 2006/0137498 A1 | 6/2006 | Bowling |
| 2006/0254044 A1 | 11/2006 | Hao |
| 2007/0033812 A1 | 2/2007 | Kimura |
| 2007/0157476 A1 | 7/2007 | Hunt |
| 2008/0017009 A1 | 1/2008 | Setliff |
| 2008/0115367 A1 | 5/2008 | Glynn |
| 2008/0235955 A1 | 10/2008 | Rosso et al. |
| 2008/0276470 A1 | 11/2008 | Ritter et al. |
| 2009/0004997 A1 | 1/2009 | Allen et al. |
| 2009/0044679 A1 | 2/2009 | Souza et al. |
| 2009/0049973 A1 | 2/2009 | Huffer et al. |
| 2009/0119930 A1 | 5/2009 | Collins |
| 2009/0261539 A1 | 10/2009 | Paulsen |
| 2009/0320299 A1 | 12/2009 | Kuhn et al. |
| 2010/0011594 A1 | 1/2010 | Wysk et al. |
| 2010/0218389 A1* | 9/2010 | Kalomeris et al. ............. 30/392 |
| 2010/0300719 A1 | 12/2010 | Fisher |
| 2011/0179930 A1 | 7/2011 | Brown et al. |
| 2011/0259168 A1 | 10/2011 | Butzen et al. |
| 2011/0314680 A1 | 12/2011 | Zhang et al. |
| 2012/0042765 A1 | 2/2012 | Kazda et al. |
| 2012/0047659 A1 | 3/2012 | Murphy |
| 2012/0073148 A1 | 3/2012 | Sergyeyenko et al. |
| 2012/0090443 A1 | 4/2012 | Butzen et al. |
| 2012/0204353 A1 | 8/2012 | Chu |
| 2012/0255180 A1 | 10/2012 | Powers et al. |
| 2012/0299254 A1 | 11/2012 | Wanstrath |
| 2013/0174701 A1 | 7/2013 | Elliston et al. |
| 2013/0227844 A1 | 9/2013 | Kazda et al. |
| 2013/0228059 A1 | 9/2013 | Kazda et al. |
| 2013/0239418 A1* | 9/2013 | Kehoe .......................... 30/277.4 |
| 2013/0255016 A1* | 10/2013 | Berney et al. .................. 15/105 |

FOREIGN PATENT DOCUMENTS

| | | |
|---|---|---|
| EP | 0779123 | 6/1997 |
| GB | 2439291 | 12/2007 |

OTHER PUBLICATIONS

2"Carbide Grit Hole Saw 49-56-0444, Milwaukee Electric Tool Company, Retrieved from Internet on Feb. 29, 2012 <URL: http://www.milwaukeetool.com/accessories/drilling/49-56-0444>.

Reciprocating Saw Blade, SAF-T-KUT, Retrieved from Internet on Jun. 28, 2011 <URL: http://www.saf-t-kut.com/products/reciprocating-saw-blade/>.

Reciprocating Saw Blades, WILPU Sageblatter, Retrieved from Internet on Feb. 26, 2013 <URL: http://wilpu.com/en/products/reciprocating-saw-blades/>.

Dewalt Folding Jab Saw and Rasp, known at least as early as Feb. 10, 2012, 1 page.

U.S. Appl. No. 13/782,995 dated Dec. 1, 2016 (12 pages).

* cited by examiner

ACCESSORY FOR A RECIPROCATING SAW

CROSS REFERENCE TO RELATED APPLICATIONS

The present application claims priority to U.S. patent application Ser. No. 61/597,538, filed Feb. 10, 2012, entitled ACCESSORY FOR A RECIPROCATING SAW, and to U.S. patent application Ser. No. 61/597,525, filed Feb. 10, 2012, entitled ACCESSORY FOR A RECIPROCATING SAW, and to U.S. patent application Ser. No. 61/597,532, filed Feb. 10, 2012, entitled ACCESSORY FOR A RECIPROCATING SAW, and to U.S. patent application Ser. No. 61/597,535, filed Feb. 10, 2012, entitled ACCESSORY FOR A RECIPROCATING SAW, and to U.S. patent application Ser. No. 61/605,445, filed Mar. 1, 2012, entitled ACCESSORY FOR A RECIPROCATING SAW, and to U.S. patent application Ser. No. 61/605,682, filed Mar. 1, 2012, entitled ACCESSORY FOR A RECIPROCATING SAW, the entire contents of all of which are hereby incorporated by reference.

BACKGROUND

The present invention relates to accessories for power tools, and more particularly to an accessory for a reciprocating saw.

Reciprocating tools, such as reciprocating saws, typically include removable blades to allow for replacement of worn or damaged blades. Reciprocating tools also include removable accessories that accommodate a working member. The accessories enable the reciprocating tools to be used for numerous applications on various working surfaces and for a variety of types of projects.

SUMMARY

In one embodiment, the invention provides an accessory for use with a reciprocating saw. The accessory includes an attachment portion and a body extending from the attachment portion. The attachment portion is configured to connect to the reciprocating saw. The body of the accessory includes a first portion extending from the attachment portion and a second portion laterally offset from the first portion. A grout rake is coupled to a distal end of the second portion. The grout rake includes one or more cutter portions for cleaning grout joints. In some embodiments, the cutter portions each have a different size for cleaning grout joints having different dimensions. In some embodiments, the grout rake is adjustable between two or more rotational orientations for positioning different cutter portions adjacent a work piece.

In another embodiment, the invention provides an accessory for use with a reciprocating saw. The accessory includes an attachment portion and a body extending from the attachment portion. The attachment portion is configured to connect to the reciprocating saw. The body of the accessory includes a fixed blade secured to projections of a first base member. Further, the first base member is secured at a predefined angle to a second base member that is oriented parallel to an axis of reciprocating motion. The second base member is attached to the reciprocating saw by support arms that are oriented perpendicular to an axis of motion. The support arms are coupled to one another on either side of an opening that receives a reciprocating blade and a removable shoe. The support arms include projections that are in contact with an outside surface of the removable shoe. When the accessory is coupled to the reciprocating saw, the fixed blade contacts at least a portion of the reciprocating blade. Therefore, when the reciprocating blade is in motion, the two blades create a surface for shearing a material.

In another embodiment, the invention provides an accessory for use with a reciprocating saw. The accessory includes an attachment portion defining a longitudinal axis generally parallel to an axis of reciprocation of the tool. The attachment portion is configured to connect to the reciprocating saw. The accessory also includes a body extending from the attachment portion. The body of the accessory includes a blade having a sharp edge for scraping paint in a reciprocating manner when the reciprocating saw is actuated. The sharp edge extends generally perpendicular to the longitudinal axis of the attachment portion.

In another embodiment, the invention provides an accessory for use with a reciprocating power tool. The accessory includes an attachment portion and a body extending from the attachment portion. The attachment portion is configured to connect to the reciprocating saw. The body of the accessory includes an arm portion extending from the attachment portion in a first plane and a transition portion extending from the arm portion in a second plane transverse to the first plane. A blade bracket is coupled to the transition portion and includes a blade having a sharp edge for scraping paint in a reciprocating manner when the reciprocating saw is actuated.

In another embodiment, the invention provides an accessory for use with a reciprocating saw. The accessory includes an attachment portion and a body extending from the attachment portion. The attachment portion is configured to connect to the reciprocating saw. The body of the accessory includes a staple puller that removes staples on a surface, such as a floor, by prying the staples via an angled edge of the staple puller moving against the staple and a bottom edge of the staple puller moving against the surface.

In another embodiment, the invention provides an accessory for use with a reciprocating saw. The accessory includes an attachment portion and a body extending from the attachment portion. The attachment portion is configured to connect to the reciprocating saw. The body of the accessory includes a first side surface and second side surface having apertures therebetween. At least one of the side surfaces includes projections or teeth that create a grating or rasping surface. The accessory further includes teeth along a bottom surface and a scraping blade along an angled end surface. Additionally, the accessory reciprocates at an angle with respect to an axis of reciprocating motion.

In another embodiment, the invention provides a reciprocating power tool including a housing supporting a motor having a drive shaft. The motor is actuatable by a trigger. The tool includes a blade clamp mechanism, and a drive mechanism. The drive clamp mechanism is coupled to the motor for converting rotational motion of the drive shaft into reciprocating motion of the blade clamp mechanism. The tool also includes an accessory having an attachment portion configured to be coupled to the blade clamp mechanism, and a body portion extending from the attachment portion. A grout rake is coupled to the body portion and includes a plurality of cutter portions. The grout rake is repositionable relative to the body portion between a first position and a second position. In the first position one of the plurality of cutter portions is located in a working position for contacting a workpiece, and in the second position another one of the plurality of cutter portions is located in the working position for contacting the workpiece.

In another embodiment the invention provides an accessory for use with a reciprocating saw. The accessory includes an attachment portion configured to be coupled to the blade clamp mechanism, and a body portion extending from the attachment portion. A grout rake is coupled to the body portion and includes a plurality of cutter portions. The grout rake is repositionable relative to the body portion between a first position and a second position. In the first position one of the plurality of cutter portions is located in a working position for contacting a workpiece, and in the second position another one of the plurality of cutter portions is located in the working position for contacting the workpiece.

In another embodiment the invention provides a grout rake for use with an accessory used with a reciprocating power tool. The grout rake includes an attachment portion configured to be coupled with the accessory, and a plurality of cutter portions extending from the attachment portion. The grout rake is configured to remove grout from a workpiece. The grout rake is configured such that at least two of the cutter portions include a unique cutting width.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
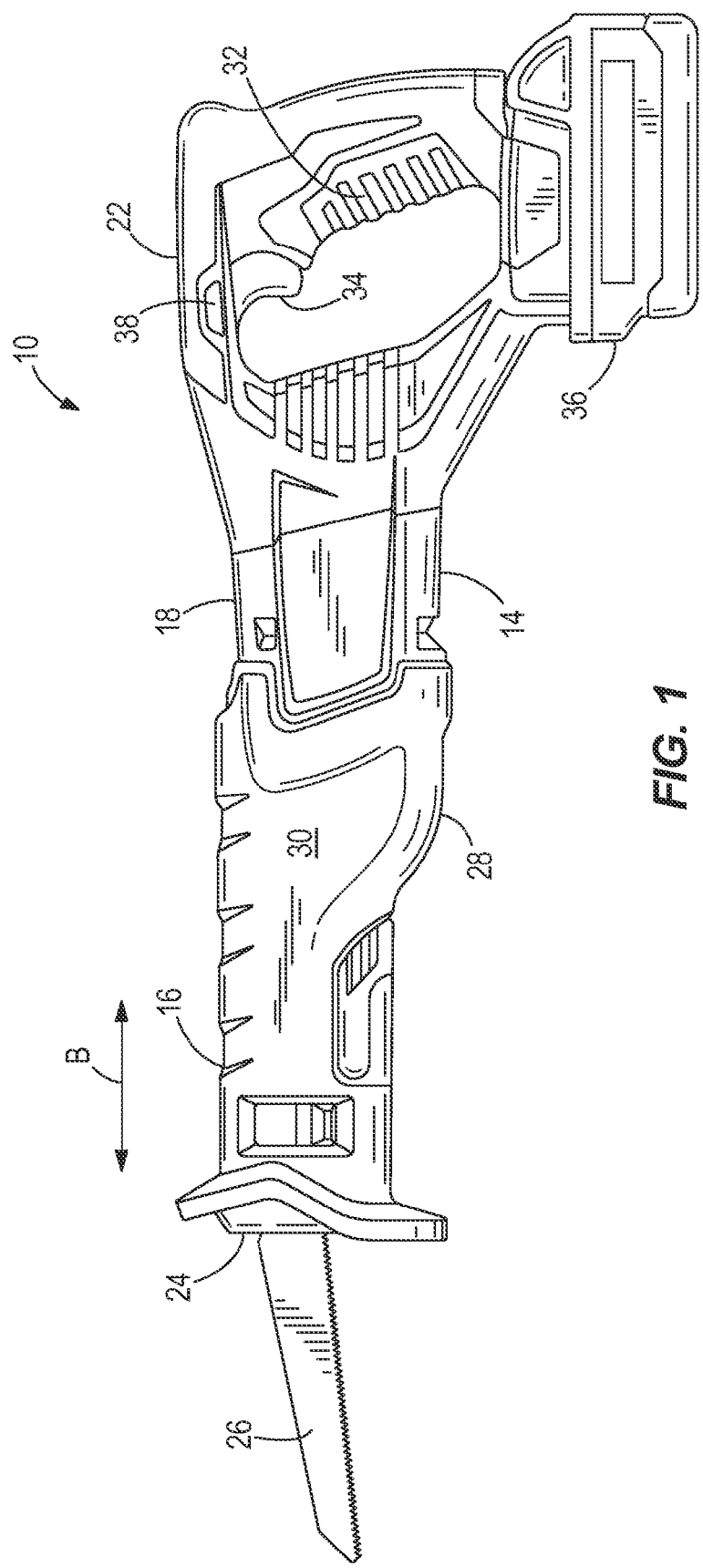
FIG. 1 is a side view of a reciprocating power tool for receiving an accessory according to an embodiment of the invention, shown in FIG. 1 receiving a saw blade.
Figure 2:
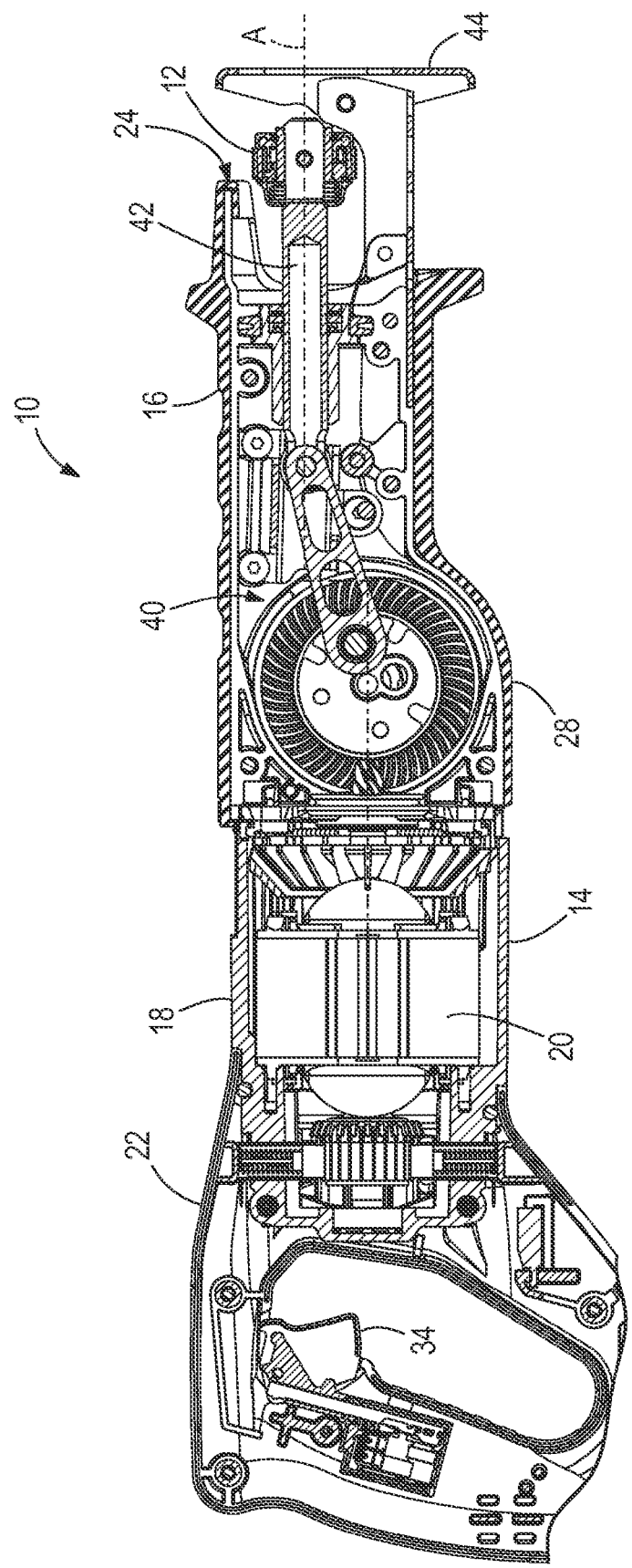
FIG. 2 is a cross-section of the reciprocating power tool shown in FIG. 1 and including a shoe.

FIGS. 1 and 2 illustrate a reciprocating power tool 10 including a blade clamp mechanism 12 (FIG. 2). The illustrated reciprocating power tool 10 is a reciprocating saw; however, in other embodiments, other reciprocating power tools may include the invention. As shown in FIGS. 1 and 2, the power tool10 includes a saw housing 14 having a forward portion 16, a body portion 18 housing a motor 20 (FIG. 2), and a handle portion 22. The forward portion 16 of the saw housing 14 includes a blade receiving aperture or end 24 that receives a saw blade 26 (FIG. 1) or an accessory 46 (FIGS. 3-6) according to one embodiment of the invention, as will be described in greater detail below. The saw blade 26, or accessory 46, is releasably coupled to a blade clamp mechanism 12 (FIG. 2) positioned within the saw housing 14, specifically, within the receiving aperture 24. In the illustrated embodiment, a boot or grip portion 28 is positioned over the forward portion 16 of the saw housing 14. In this embodiment, the boot 28 provides a grip area 30 for the user and/or provides protection to the tool 10. In some embodiments, the boot 28 is over-molded onto the forward portion 16. The handle portion 22 includes an over-mold to define an ergonomic grip 32 and allows a user to hold and control the power tool 10.

With continued reference to FIGS. 1 and 2, the power tool 10 includes a trigger-type power switch 34 for activating a power supply 36 of the tool 10 and a button or switch 38 for selecting a speed level (e.g., a high speed or a low speed) for reciprocating the saw blade 26. In the illustrated embodiment, the power supply 36 is a rechargeable battery pack. The battery pack 36 is releasably coupled to the handle portion 22 to provide power to the power tool 10, and is releasable away from and rearward of the handle portion 22. In the illustrated embodiment, the battery pack 36 is an eighteen-volt (18V) rechargeable power tool battery pack. In other embodiments, the battery pack 36 may be a twelve-volt (12V), a twenty-four-volt (24V), or other various voltages. According to another embodiment, the power supply 36 may be an alternating current (AC) power provided via a corded plug electrically coupled to a wall outlet or any number of suitable powering options.

With reference to the cross section illustrated in FIG. 2, the reciprocating tool 10 also includes a drive mechanism 40 positioned substantially within the housing 14. The drive mechanism 40 is coupled to the motor 20 and to a spindle 42 for transferring rotational motion of a shaft of the motor 20 into reciprocating motion of the spindle 42 along a longitudinal axis A relative to the housing 14. The blade clamp mechanism 12 is disposed at a distal end of the spindle 42 for receiving the accessory 46. The blade clamp mechanism 12 secures the accessory 46 to the spindle 42 for reciprocation with the spindle 42 in a direction B (FIG. 1) parallel to the longitudinal axis A. In other embodiments, other suitable types and configurations of blade clamp mechanisms may be employed.

The reciprocating tool 10 also includes a removable shoe 44, illustrated in FIG. 2, operable to engage a work piece and provide stability to the tool 10 while cutting. The removable shoe 44 may be removed when the accessory 46 is attached to the blade clamp mechanism 12. The shoe 44 acts as a stop to limit the depth of the saw blade 26 into the workpiece and to prevent the workpiece from engaging the saw blade 26 at a connection of the saw blade 26 to the tool 10, e.g., at the blade clamp mechanism 12. In some embodiments, the shoe 44 freely pivots about an axis to allow the user to adjust an angle at which the blade 26 engages the workpiece during a cut. In some embodiments, the reciprocating tool 10 may not include a shoe.

In other embodiments, the power tool 10 may include various handle constructions, drive mechanisms, blade clamp mechanisms, and power configurations. In further embodiments, the power tool 10 may include other types of power and speed control switches or may not include a speed control feature.

FIGS. 3-6 illustrate the accessory 46 according to an embodiment of the invention. The accessory 46 includes an attachment portion 48 and a body 50 extending from the attachment portion 48. The attachment portion 48 includes a tang 52 and an aperture 54. The tang 52 and the aperture 54 are configured to engage the blade clamp mechanism 12 to securely and releasably connect the accessory 46 to the reciprocating tool 10. The attachment portion 48 defines a longitudinal axis B that, when attached to the blade clamp mechanism 12, is parallel to the longitudinal axis A of reciprocation of the spindle 42. In some embodiments, the longitudinal axis B is coincident with the longitudinal axis A when the accessory 46 is attached to the blade clamp mechanism 12. In other embodiments, other types or configurations of attachment portions may be employed in order to suit the blade clamp mechanism 12 of the reciprocating tool 10.

Figure 3:
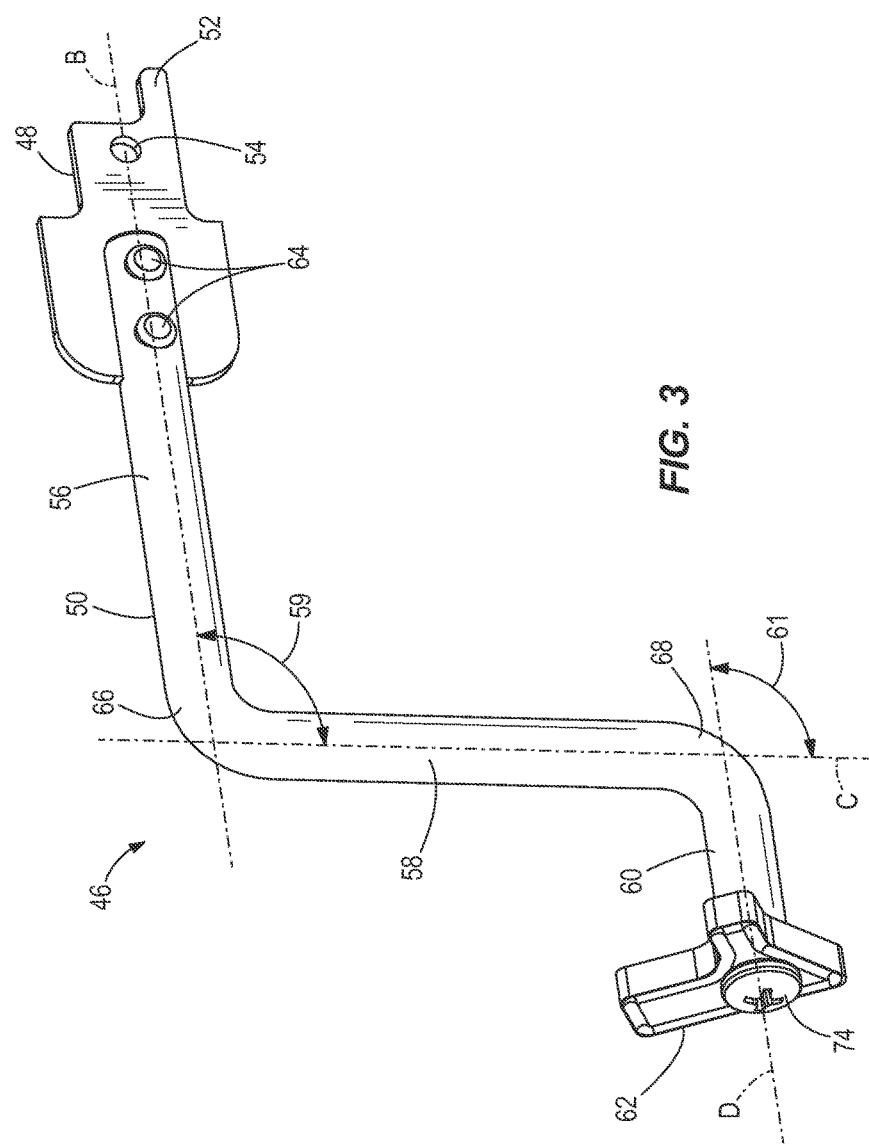
FIG. 3 is a perspective view of an accessory including a grout rake portion according to an embodiment of the invention.

The body 50 includes a first portion 56, a second portion 58 extending from the first portion 56, a third portion 60 extending from the second portion 58 and a grout rake 62 coupled to a distal end 70 (FIG. 4) of the third portion 60. The first, second and third portions 56, 58, 60 of the body 50 are substantially cylindrical, or circular in cross section. In other embodiments, other suitable geometries and cross-sections may be employed. The first portion 58 extends from the attachment portion 48 substantially parallel and preferably coincident with the longitudinal axis B, as illustrated in FIG. 3. In the illustrated embodiment, the body 50 is fastened to the attachment portion 48 by rivets 64. In other embodiments, other fasteners or fastening means may be employed, such as screws, bolts, glue, adhesives, welding, soldering and the like. In yet other embodiments, the body 50 and the attachment portion 48 may be formed as one piece.

The second portion 58 extends from the first portion 56 and between the first and third portions 56, 60. In the illustrated embodiment, the second portion 58 is substantially perpendicular to the first and third portions 56, 60, the first and third portions 56, 60 being substantially parallel to each other. The second portion 58 defines a longitudinal axis C having an angle 59 with respect to the longitudinal axis B. The angle 59 is preferably between about 0 degrees and about 180 degrees and more preferably between about 45 degrees and about 135 degrees. Most preferably, the angle 59 is about 90 degrees, as illustrated. The third portion 60 extends from the second portion 58 and defines a longitudinal axis D having an angle 61 with respect to the longitudinal axis C. The angle 61 is preferably between about 0 degrees and about 180 degrees and more preferably between about 45 degrees and about 135 degrees. Most preferably, the angle 61 is about 90 degrees, as illustrated. The second portion 58 provides a lateral offset between the first portion 56 and the third portion 60. As illustrated, the longitudinal axis D of the third portion 60 is substantially parallel to and laterally offset from the longitudinal axis B of the first portion 56 and, similarly, from the longitudinal axis A of reciprocation of the spindle 42. Therefore, the grout rake 62 is positioned for reciprocation along a work piece parallel to and laterally offset from the longitudinal axis A of reciprocation of the spindle 42. Accordingly, in other embodiments, the second portion 58 may be oriented at other angles (angles 59 and 61) with respect to the first and third portions 56, 60, respectively, in order to offset the grout rake 62 from the longitudinal axis A. In yet other embodiments, the first, second and third portions 56, 58, 60 may be partially or continuously curved. In the illustrated embodiment, the first, second and third portions 56, 58, 60 are formed as one piece and connected by bent joints 66, 68, respectively. In other embodiments, the first, second and third portions 56, 58, 60 may be formed from separate pieces and joined by fasteners, welding, soldering, and the like.

Figure 4:
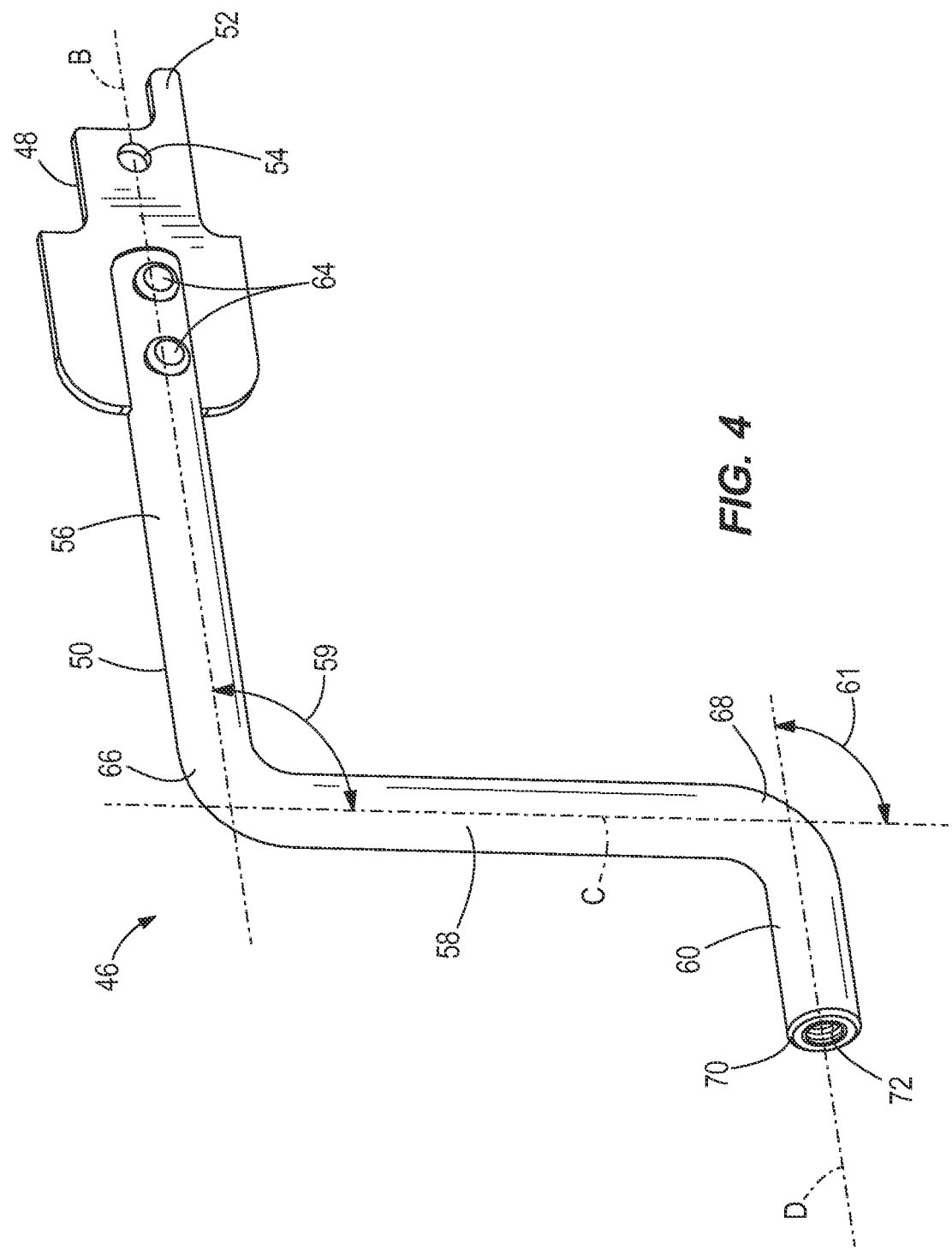
FIG. 4 is perspective view of the accessory shown in FIG. 3 having the grout rake portion removed.

As illustrated in FIG. 4, the grout rake 62 is removably fastened to the distal end 70 of the third portion 60 opposite the attachment portion 48. The distal end 70 of the third portion 60 includes an aperture 72 for receiving a fastener 74. The fastener 74 is removable and removably couples the grout rake 62 to the body 50. In the illustrated embodiment, the fastener 74 is a screw. In other embodiments, the fastener 74 may be a different type of removable fastener. In yet other embodiments, the grout rake 62 may be coupled to the body 50 in other ways, such as by a detent mechanism or other toolless removable mechanism. In yet other embodiments, the grout rake 62 may be fixedly coupled to the body 50 or formed as one piece with the body 50.

Figure 5:
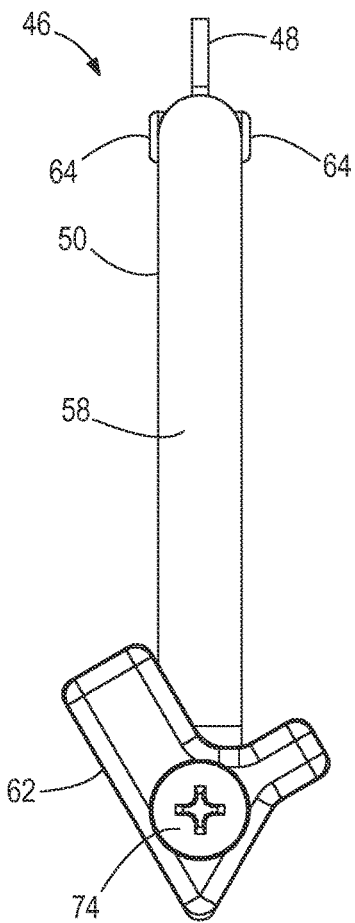
FIG. 5 is a front view of the accessory shown in FIG. 3.
Figure 6:
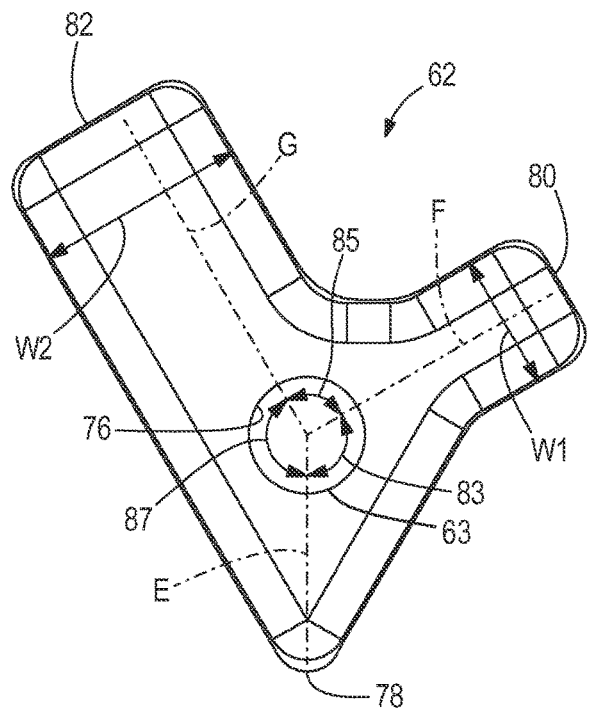
FIG. 6 is a front view of the grout rake portion of the accessory shown in FIG. 3.

As illustrated in FIGS. 5-6, the grout rake 62 includes a hub 63 having an aperture 76 (FIG. 6) for receiving the fastener 74 therethrough to couple the grout rake 62 to the body 50. The grout rake 62 also includes a plurality of cutter portions extending from the hub 63 in different directions. For example, in the illustrated embodiment the plurality of cutter portions includes a first cutter portion 78, a second cutter portion 80 and a third cutter portion 82. The first, second and third cutter portions 78, 80, 82 each have a different size and/or shape for cleaning grout joints having different dimensions. The first cutter portion 78 has a rounded or curved tip. The second cutter portion 80 has a rectangular-shaped tip having rounded corners and a first width W1. The third cutter portion 82 has a rectangular-shaped tip having rounded corners and a second width W2 greater than the first width W1. In other embodiments, the first, second and third cutter portions 78, 80, 82 may have other shapes and geometries, such as a sharp point, a rectangular shape with sharp corners, teeth, serrations, or another suitable shape. In some embodiments, the grout rake 62 may include only one cutter portion. In other embodiments, the grout rake 62 may include two, four, or more cutter portions.

The first, second and third cutter portions 78, 80, 82 are arranged about the aperture 76 and extend generally radially from the aperture 76. The first cutter portion 78 generally extends from the aperture 76 along a first axis E, the second cutter portion 80 generally extends from the aperture 76 along a second axis F, and the third cutter portion 82 generally extends from the aperture 76 parallel to a third axis G. The first cutter portion 78 is substantially centered about the first axis E, the second cutter portion 80 is substantially centered about the second axis F, and the third cutter portion 82 is parallel to and laterally offset from the third axis G. In other embodiments, the first, second and third cutter portions 78, 80, 82 may be arranged in any combination of centered or laterally offset from their respective axes. In yet other embodiments, the first, second and third cutter portions 78, 80, 82 may extend along or parallel to respective axes that do not extend radially from the aperture 76.

An angle 83 is defined between the first axis E and the second axis F. An angle 85 is defined between the second axis F and the third axis G. An angle 87 is defined between the third axis G and the first axis E. In the illustrated embodiment, the angle 83 is about 120 degrees, the angle 85 is about 90 degrees and the angle 87 is about 150 degrees. In other embodiments, the angles 83, 85, 87 may be distributed differently. For example, all three angles 83, 85, 87 may be about 120 degrees.

In operation, an operator attaches the attachment portion 48 of the accessory 46 to the blade clamp mechanism 12 for reciprocation with the spindle 42 of the reciprocating tool 10. The accessory 46 reciprocates generally parallel to the longitudinal axis A of the spindle 42, guiding one of the first, second and third cutter portions 78, 80, 82 back and forth along the surface of a work piece, for example, to cut and remove grout. The grout rake 62 may be adjusted to change which cutter portion 78, 80, 82 is in contact with the work piece. The grout rake 62 is repositionable relative to the body portion 50 between at least a first position and a second position. In the illustrated embodiment, the grout rake 62 has a first position, a second position and a third position corresponding to a first cutter portion 78, a second cutter portion 80 and a third cutter portion 82, respectively; however, in other embodiments, the grout rake 62 may have a different number of cutter portions and therefore a different number of positions, such as only two, four or more, etc. Preferably, the number of positions corresponds with the number of cutter portions. In each position, one of the plurality of cutter portions (i.e., first, second or third cutter portions 78, 80, 82, respectively) is located in a working position for contacting the workpiece. For example, in the illustrated embodiment, which is merely exemplary, the first cutter portion 78 is in the working position. If it is desired that another one of the plurality of cutter portions (e.g., one of the second or third cutter portions 80, 82) be located in the working position, the grout rake 62 is repositioned such that in the second cutter portion 80 arrives at the working position (e.g., the second position), or such that the third cutter portion 82 arrives at the working position (e.g., the third position). The operator removes the fastener 74, rotates the grout rake 62 to the desired position and replaces the fastener 74 to fasten the grout rake 62 to the body 50 in order to adjust the grout rake 62 into one of the at least first or second positions. The grout rake 62 may also be replaced with a new or different grout rake 62 in a similar manner.

FIGS. 7-15 illustrate an accessory 146 according to another embodiment of the invention. The accessory 146 facilitates the cutting or shearing of a material, and includes a blade 192 that provides a cutting or shearing surface or edge 198. The cutting or shearing function is achieved when the reciprocating blade 26 moves against the cutting edge 198. The accessory 146 is coupled to the reciprocating tool 10 by support arms 208, 210. The support arms 208, 210 are coupled to one another and form an opening 220 that snugly receives the removable shoe 44 and the reciprocating blade 26.

Figure 7:
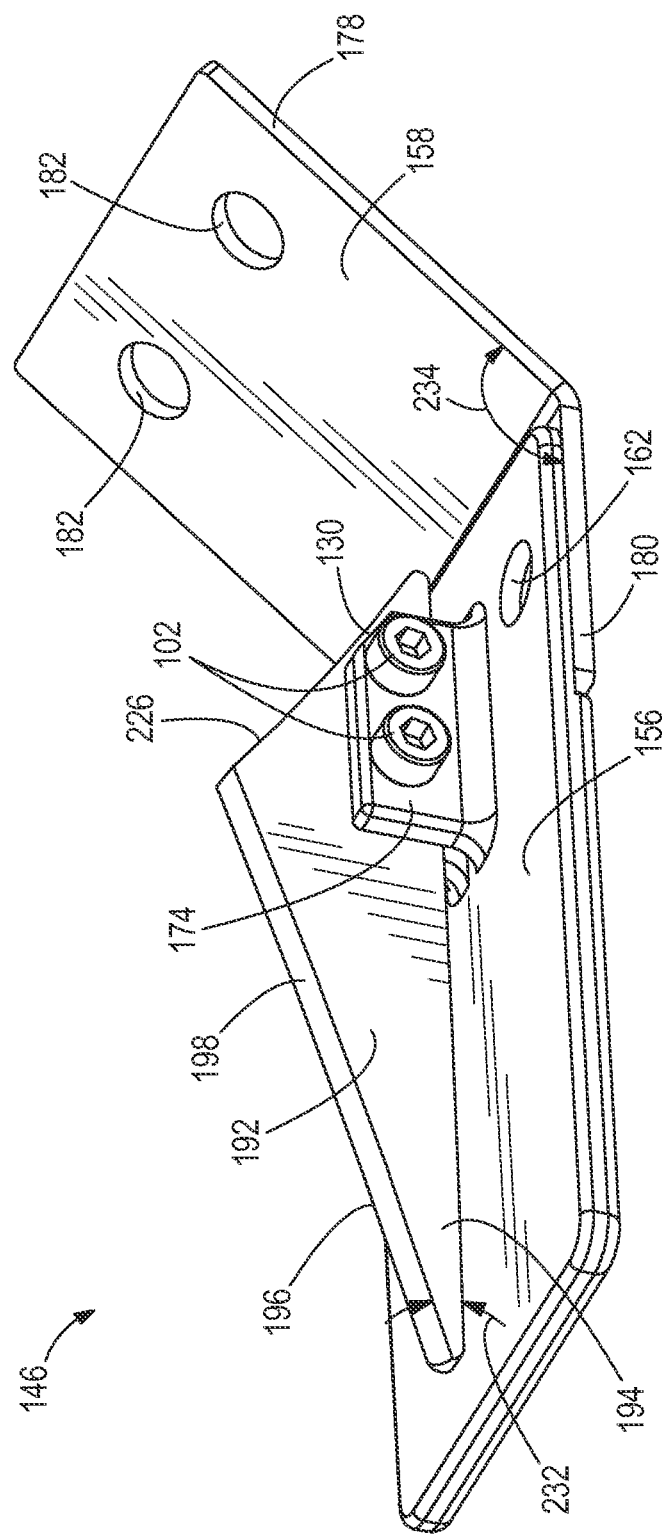
FIG. 7 is a perspective view of an accessory including a first base member, a second base member and a fixed blade according to another embodiment of the invention.
Figure 8:
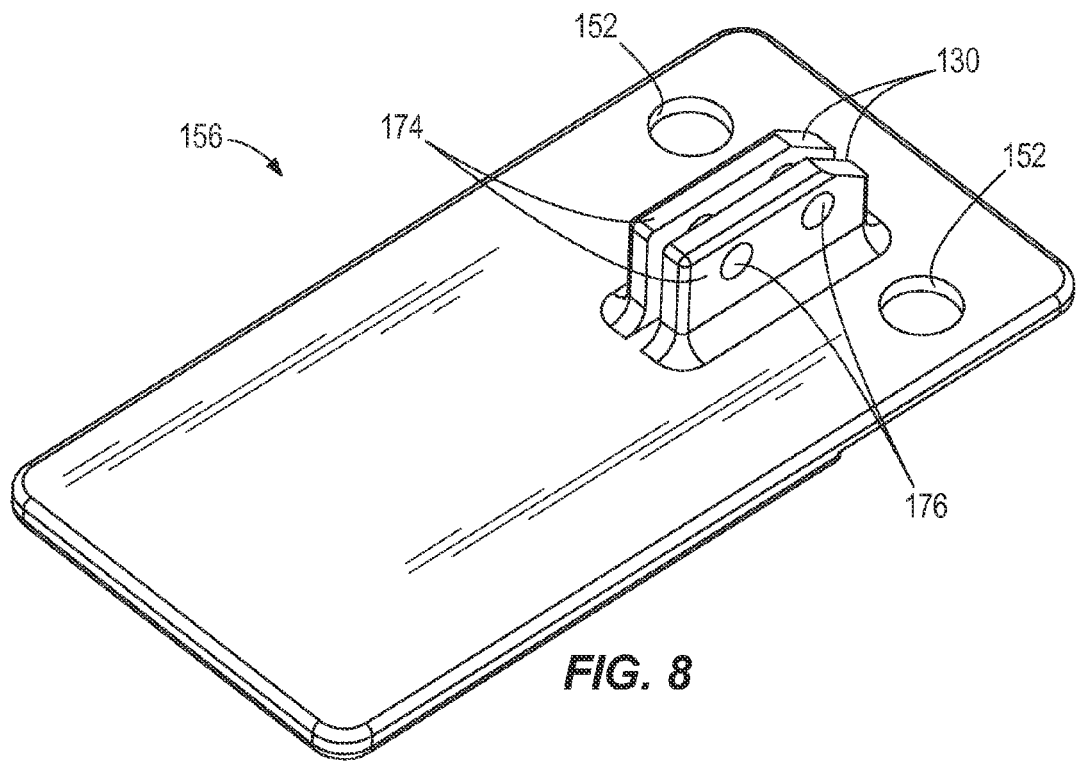
FIG. 8 is a perspective view of the first base member of FIG. 7.
Figure 9:
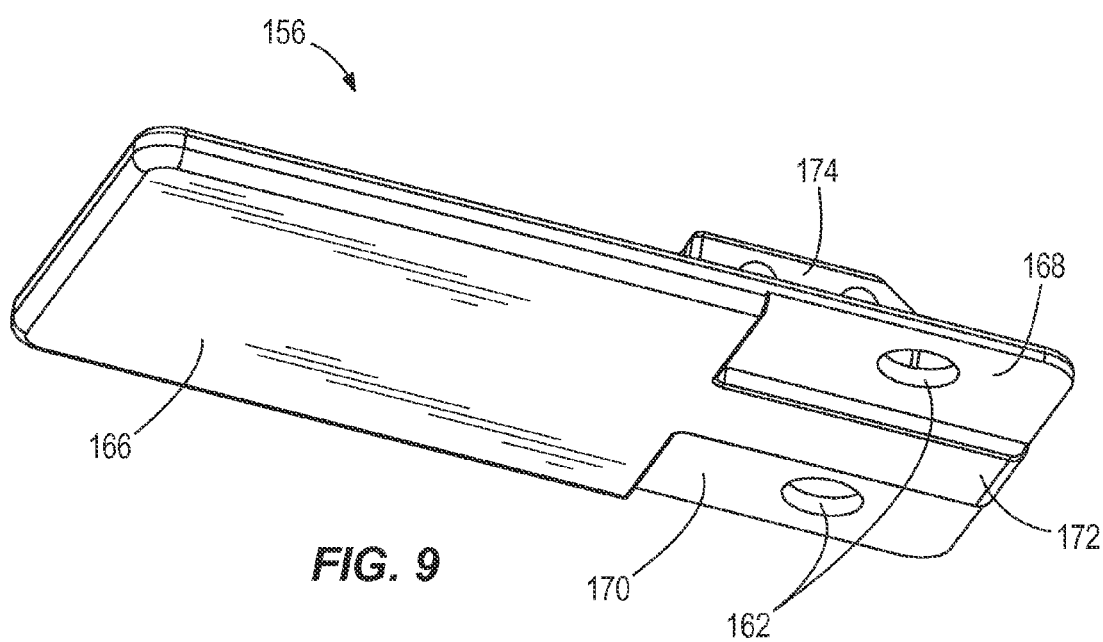
FIG. 9 is a perspective view of a bottom surface of the first base member of FIG. 7.

The accessory 146 includes a first base member 156 and a second base member 58 (FIGS. 7-9). The first and second base members 156, 158 are connected to one another via connections 162, 164 on the mating surfaces. In the illustrated embodiment, the connections 162, 164 are apertures that accept a fastener (not shown), such as a bolt or some other fastening means. The first base member 156 includes a bottom surface 166 that defines a first recessed portion 168 and second recessed portion 170 with a non-recessed portion 172 therebetween (FIG. 9). The first base member 156 further includes a pair of projections 174 extending from an upper surface. The projections 174 are integrally formed with the first base member 156, but in further embodiments are secured by other means. The projections 174 are generally rectangular and include a rear chamfered edge 130 and connections 176, which are apertures in the illustrated embodiment.

Figure 10:
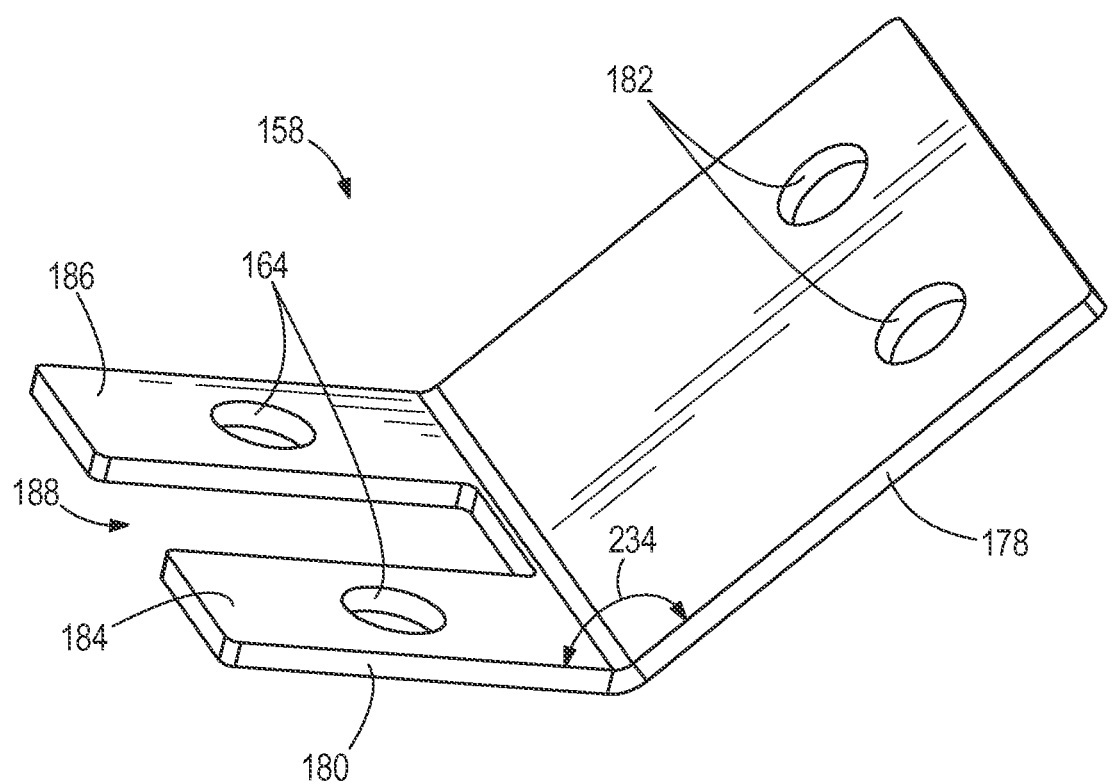
FIG. 10 is a perspective view of the second base member of FIG. 7.
Figure 11:
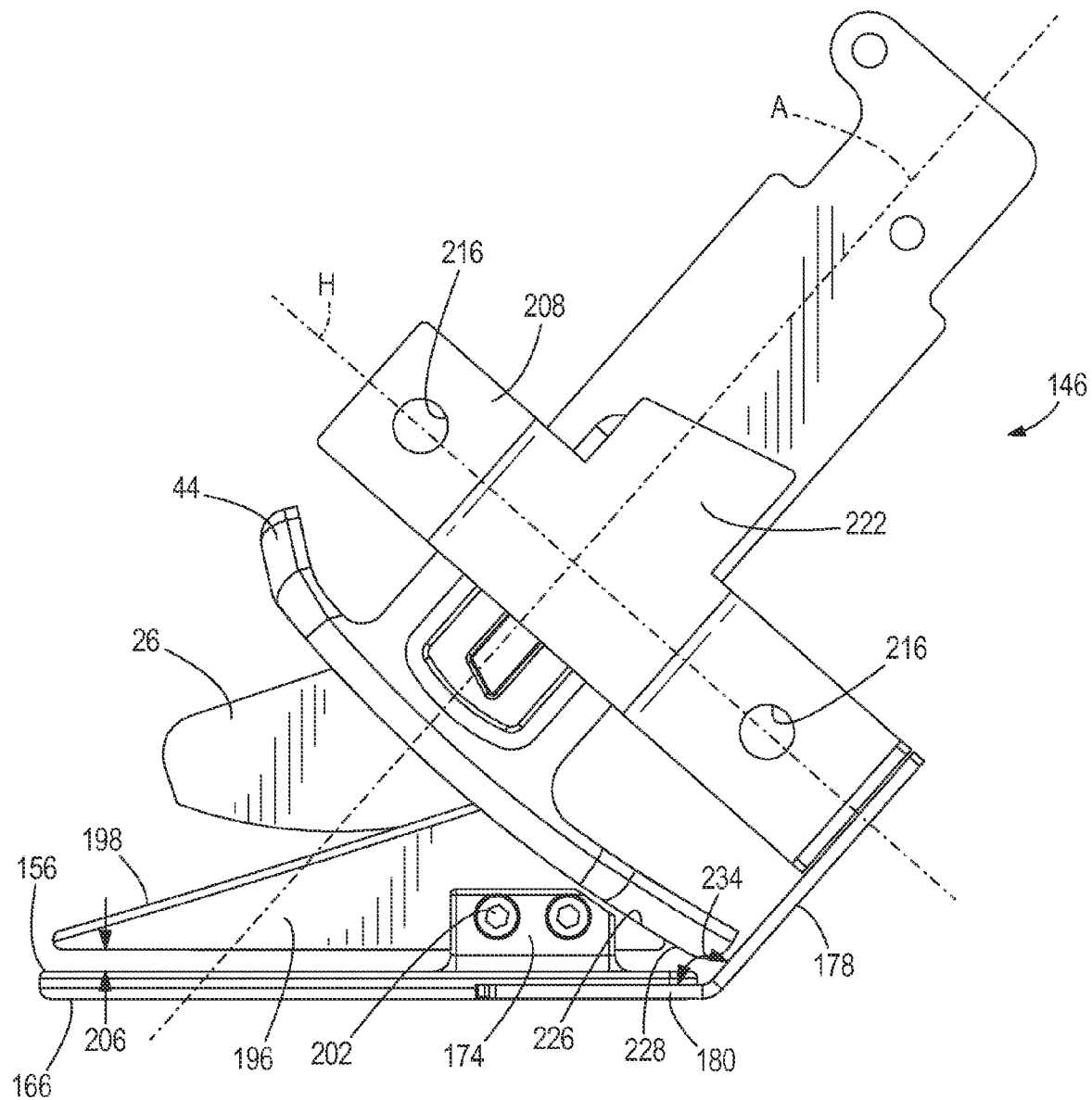
FIG. 11 is a side view of the accessory of FIG. 7 in relation to a pair of support arms, a removable shoe, and a reciprocating saw blade.
Figure 12:
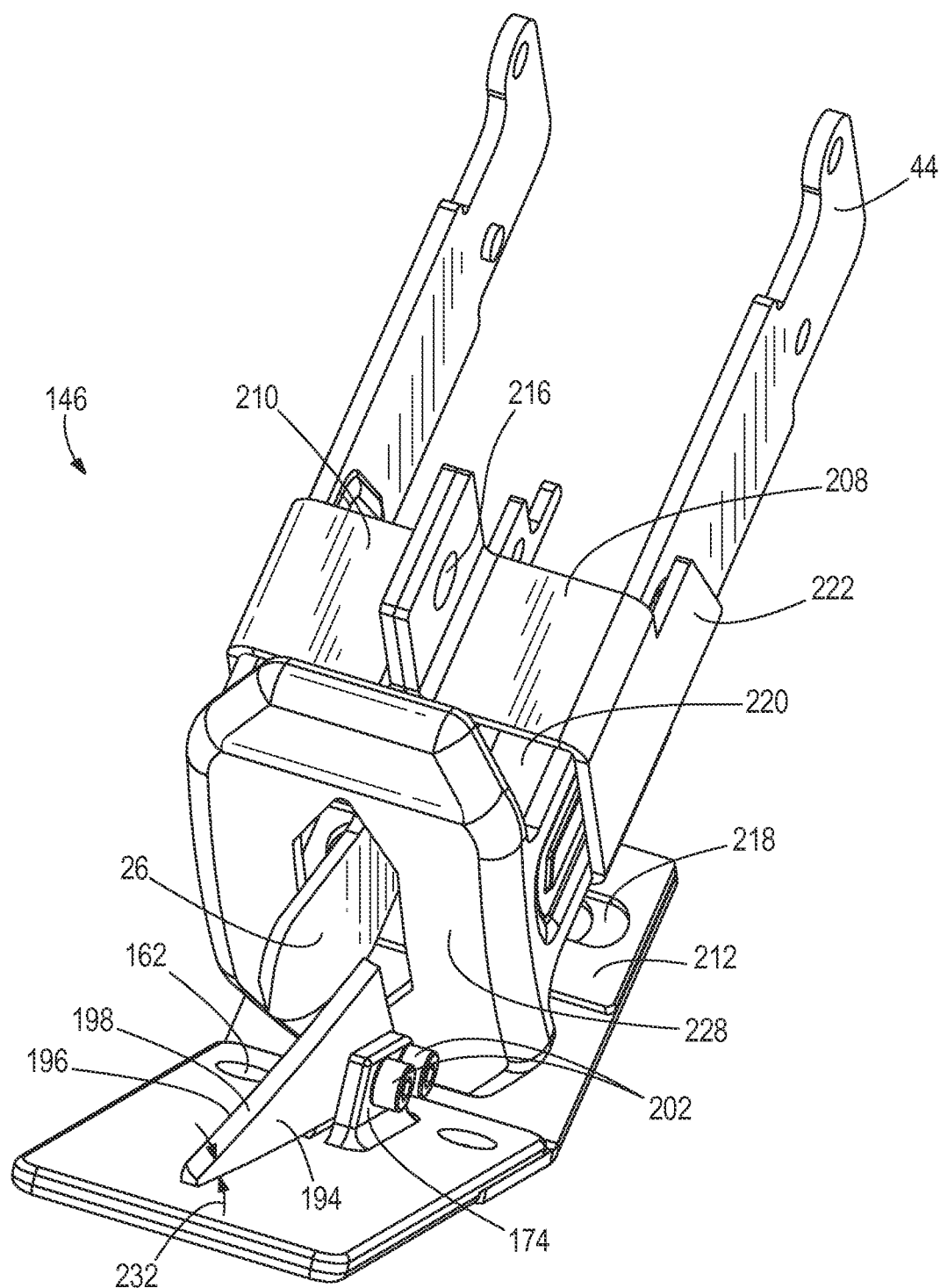
FIGS. 12 and 13 are perspective views of the accessory shown in FIG. 11.
Figure 13:
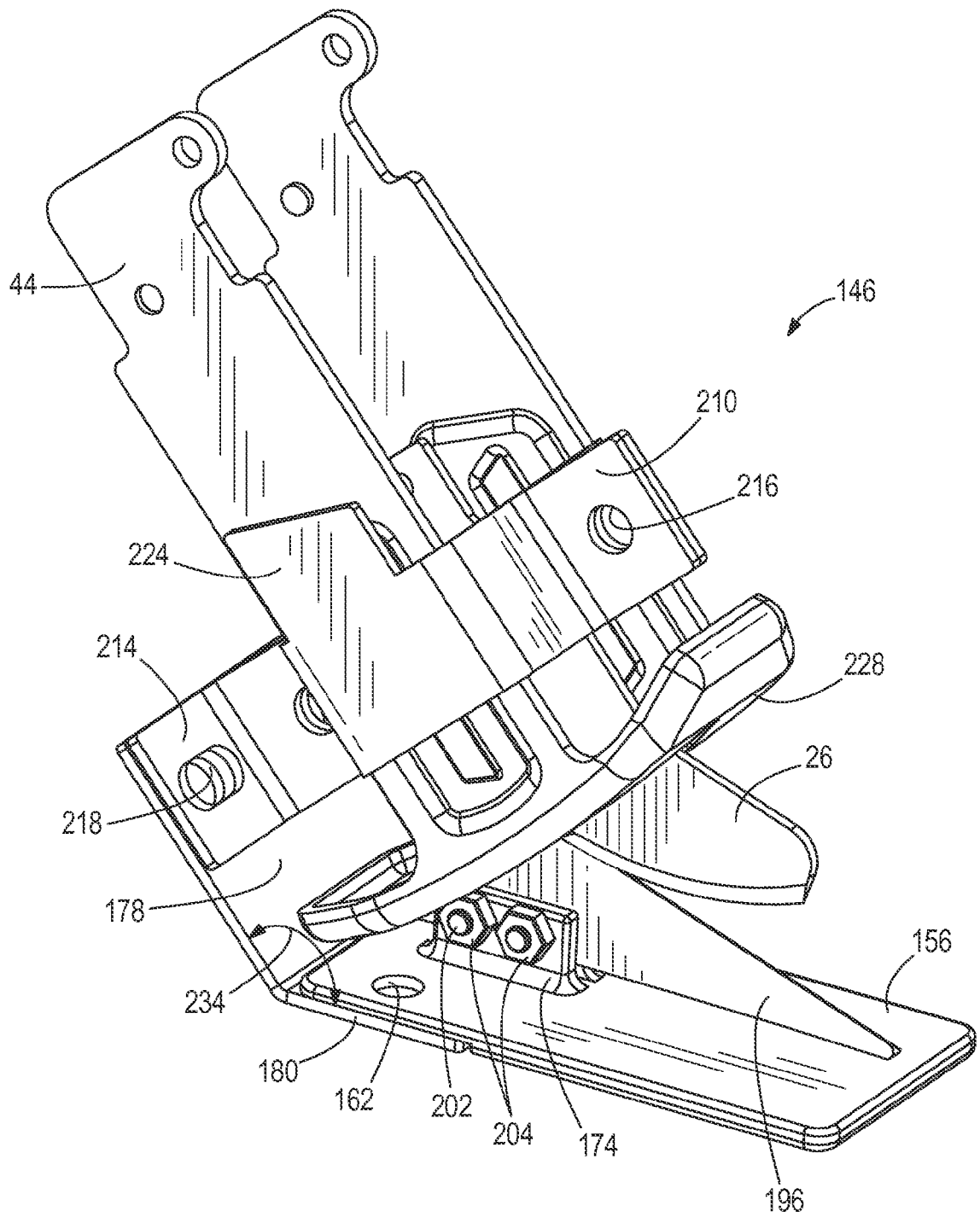
Figure 14:
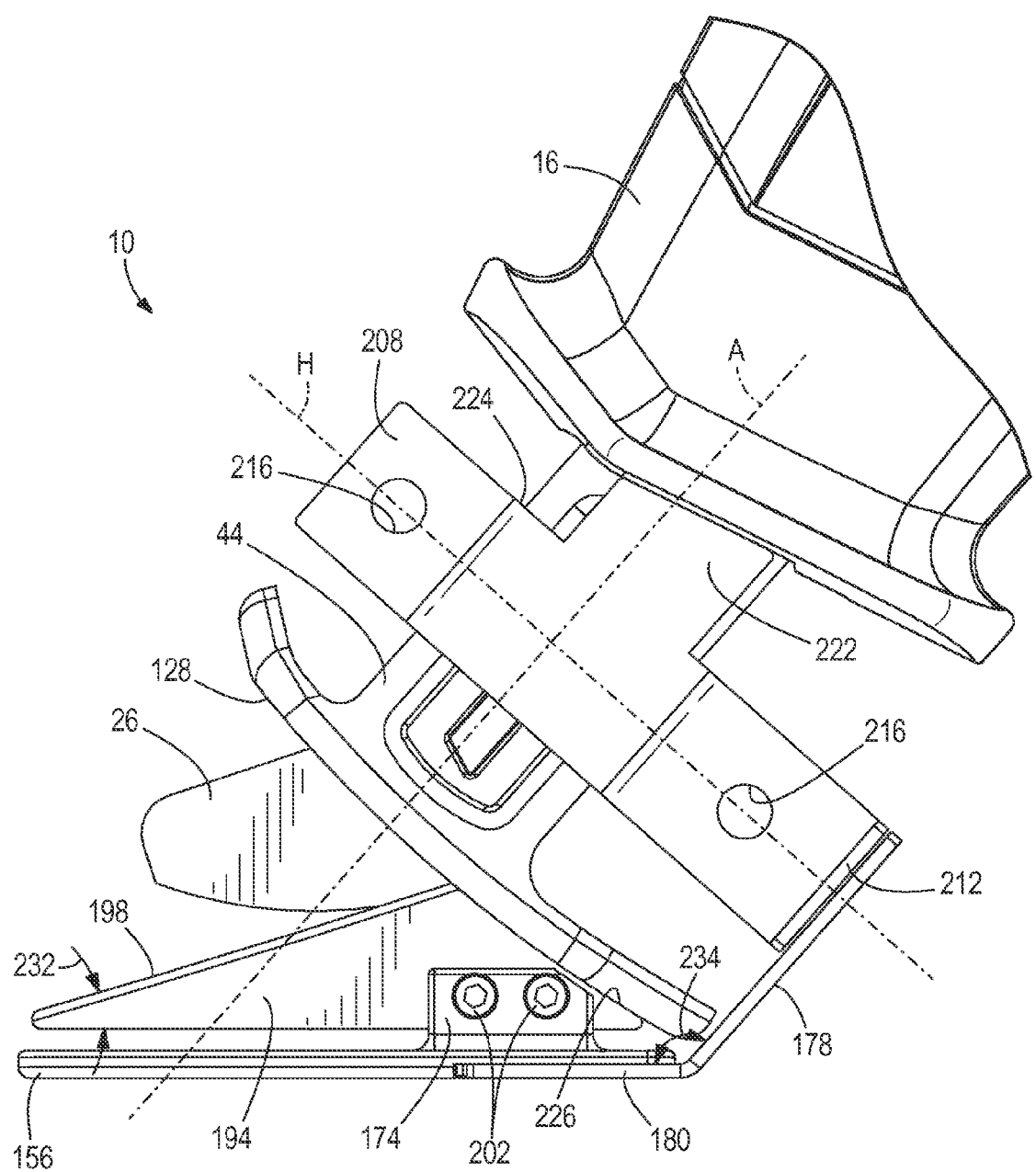
FIG. 14 is a side view of the accessory of FIGS. 11-13 coupled to the reciprocating power tool shown in FIGS. 1-2.
Figure 15:
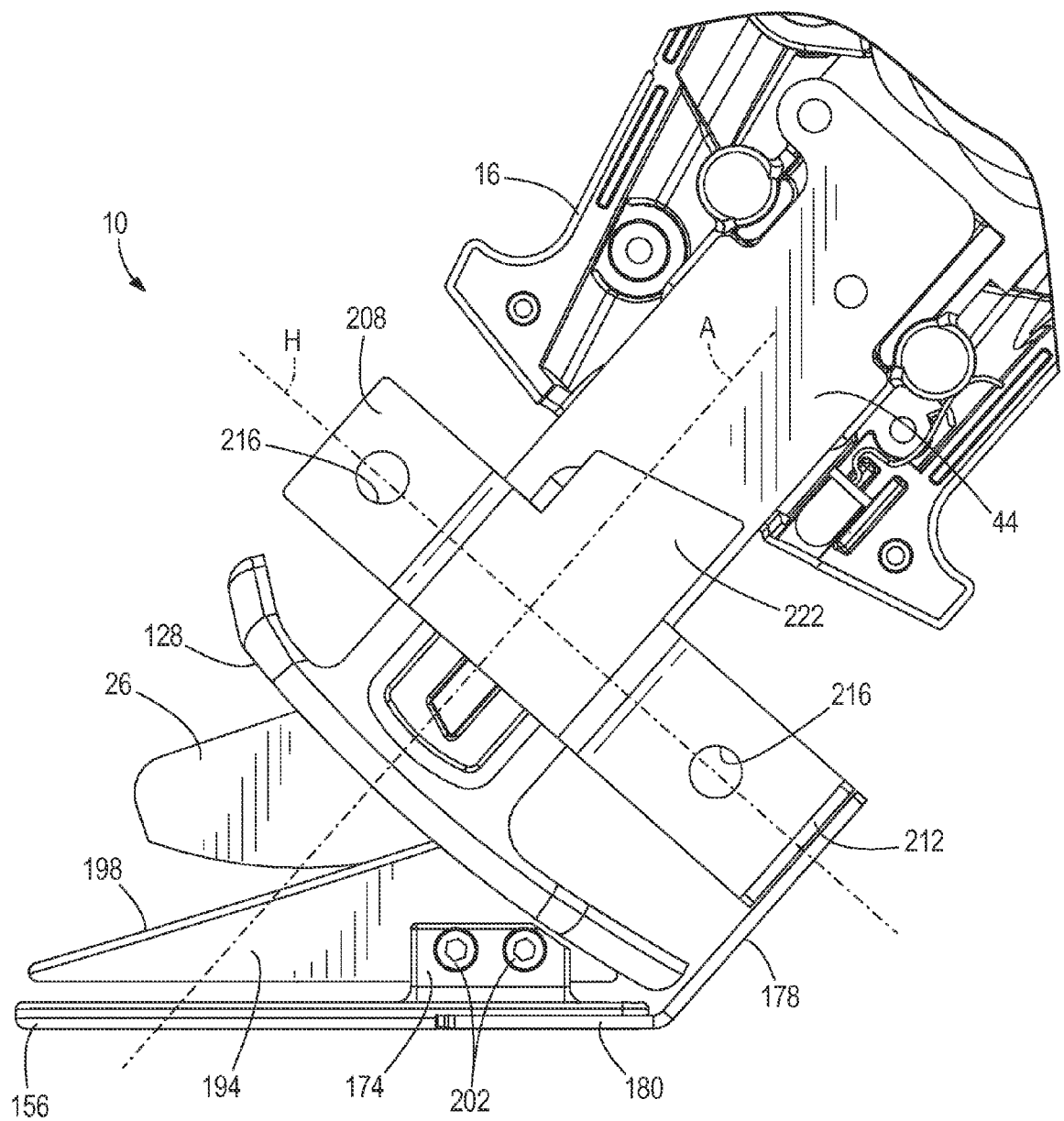
FIG. 15 is a side view of the accessory of FIGS. 11-13 coupled to the reciprocating power tool shown in FIGS. 1-2 and having a portion of a housing of the reciprocating power tool removed.
Figure 16:
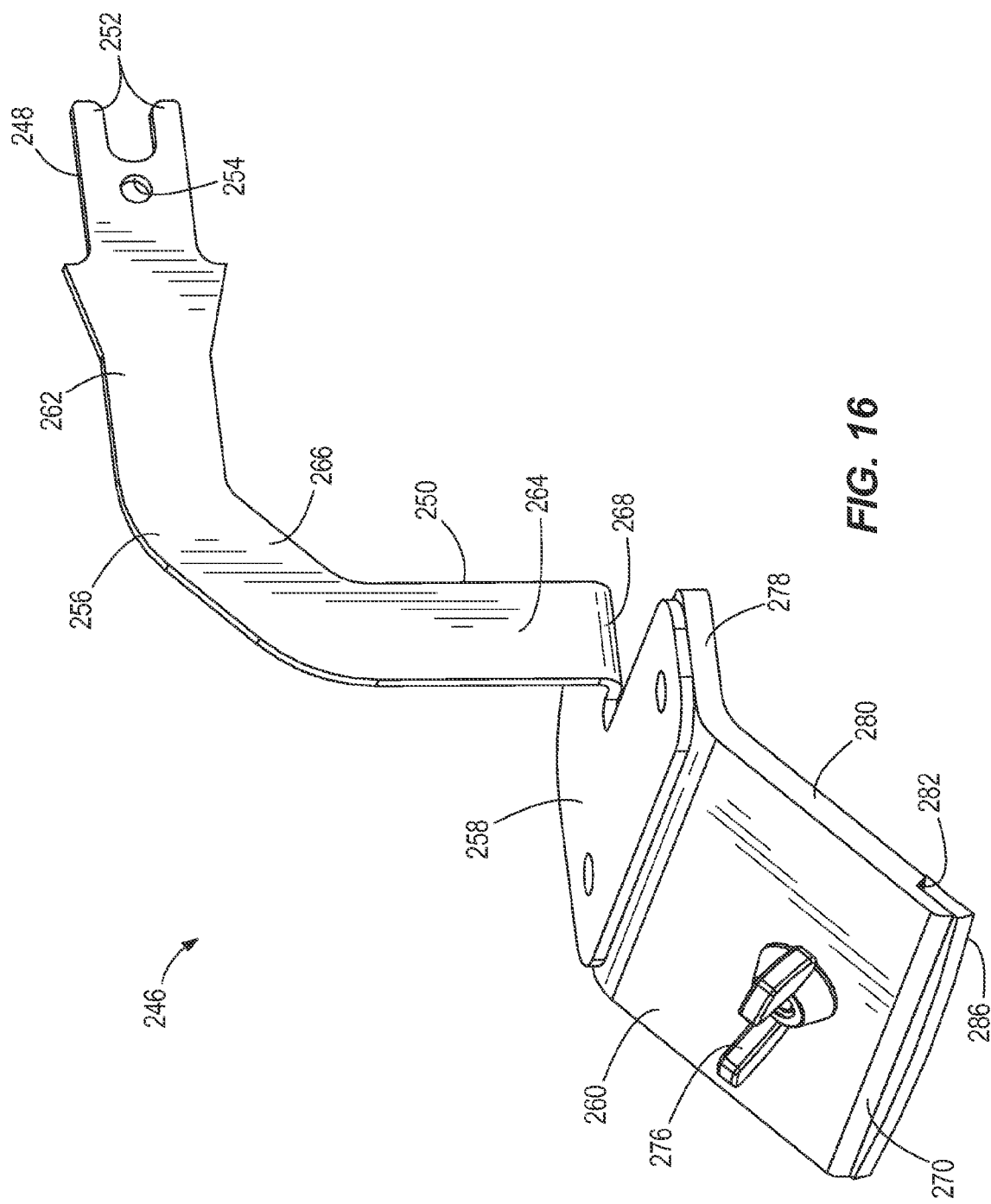
FIG. 16 is a front perspective view of an accessory according to another embodiment of the invention.

Referring to FIG. 10, the second base member 158 includes a first member 178 and a second member 180. The first member 178 is oriented parallel to axis A when coupled to the saw. The second member 180 is oriented at an angle 234 with respect to the first member 178 and therefore, to the axis A. In the illustrated embodiment, the angle 234 between the first member 178 and the second member 180 is about 131.5 degrees. However, in further embodiments the angle 234 may be between about 120 degrees and about 145 degrees. The second member 180 includes a first leg 184 and a second leg 186 defining an opening 188 therebetween. The two legs 184, 186 of the second base member 158 mate with the two recessed portions 168, 170 of the first base member 156 so that the opening 188 in the second base member 158 receives the non-recessed portion 172 of the first base member 156. Therefore, the first base member 156 is secured at the predefined angle 234 with respect to the second base member 158 and also, axis A.

Further with respect to FIG. 7, the cutting edge 198 of blade 192 is located between a first side 194 and a second side 196. The second side 196 extends above the first side 194, such that the cutting edge 198 of the blade 192 is angled in the direction of the first side 194 to provide a cutting surface. The blade 192 is generally triangularly shaped and includes connections 200, which are apertures in the illustrated embodiment. The blade 192 is received between the projections 174 of the first base member 156 such that an edge 226 of blade 192 rests against a front face 228 of the shoe 44. Fasteners 202 (e.g., blade screws or some other fastening means), which are coupled to washers 204 or some other means of attachment, extend through the connections 200 in the blade 192 and the projections 174 to fix the blade 192 to the first base member 156. When the blade 192 is secured between the pair of projections 174, a space 206 is defined between the blade 192 and the first base member 156.

With reference to FIGS. 11-15, the accessory 146 is coupled to the reciprocating tool 10 by the support arms 208, 210. The support arms 208, 210 define an axis H and are generally perpendicular to the reciprocating motion of blade 26 along axis A. Further, each support arm 208, 210 includes a flange 212, 214, respectively, that is coupled to the second base member 158. Connections 218 in the flanges 212, 214 are fastened to connections 182 in the second base member 158 by fasteners, such as bolts (not shown). Additionally, the support arms 208, 210 are coupled to one another on either side of the reciprocating saw 10. When coupled, the support arms 208, 210 define the opening 220 that receives the reciprocating saw blade 26 and the shoe 44. Further, the arms 208, 210 are coupled together by a pair of connections 216 that receive fasteners (not shown), such as bolts. Each support arm 208, 210 also includes a projection 222, 224 that extends in parallel to axis A along the shoe 44. The projections 222, 224 are flush to and fit snugly against an outside surface of the shoe 44 to couple the accessory 146 to the tool 10 via the shoe 44.

When the accessory 146 is coupled to the reciprocating saw 10, the blade 192, which is fixed to the first base member 156, is oriented so that the blade 192 is offset from the reciprocating blade 26. Therefore, a portion of the reciprocating blade 26 is in contact with the second side 196 of the blade 192. As such, the blade 192 of the accessory 146 provides a surface for shearing a material (not shown) placed between the two blades 26, 192 while the blade is reciprocating.

During operation, the reciprocating blade 26 moves against the blade 192 that is fixed to the first base member 156 to perform a cut. The blade 192 is oriented at an angle 232, which is between about 0 degrees and about 15 degrees, with respect to the first base member 156 allowing the user to propel the reciprocating saw 10 forward thereby using the first base member 156 as a support surface. As such, a material can be cut in one continuous motion.

FIGS. 16-19 illustrate an accessory 246 according to another embodiment of the invention. The accessory 246 includes an attachment portion 248 and a body 250 extending from the attachment portion 48. The attachment portion 248 includes tangs 252 and an aperture 254. The tangs 252 and the aperture 254 are configured to engage the blade clamp mechanism 12 to securely and releasably connect the accessory 246 to the reciprocating tool 10. The attachment portion 248 defines a longitudinal axis B' that, when attached to the blade clamp mechanism 12, is parallel to the longitudinal axis A of reciprocation of the spindle 42. In some embodiments, the longitudinal axis B' is coincident with the longitudinal axis A when the accessory 246 is attached to the blade clamp mechanism 12. In other embodiments, other types or configurations of attachment portions may be employed in order to suit the blade clamp mechanism 12 of the reciprocating tool 10.

The body 250 includes an arm portion 256, a transition portion 258 and a blade bracket 260. The arm portion 256 extends from the attachment portion 248. The attachment portion 248 and the arm portion 256 are generally coplanar and lie generally along a plane X, as illustrated in the front view of FIG. 17. The longitudinal axis B is substantially parallel to the plane X. When the accessory 46 is attached to the reciprocating saw 10, the longitudinal axis A of the spindle 42 is also substantially parallel to the plane X.

Figure 18:
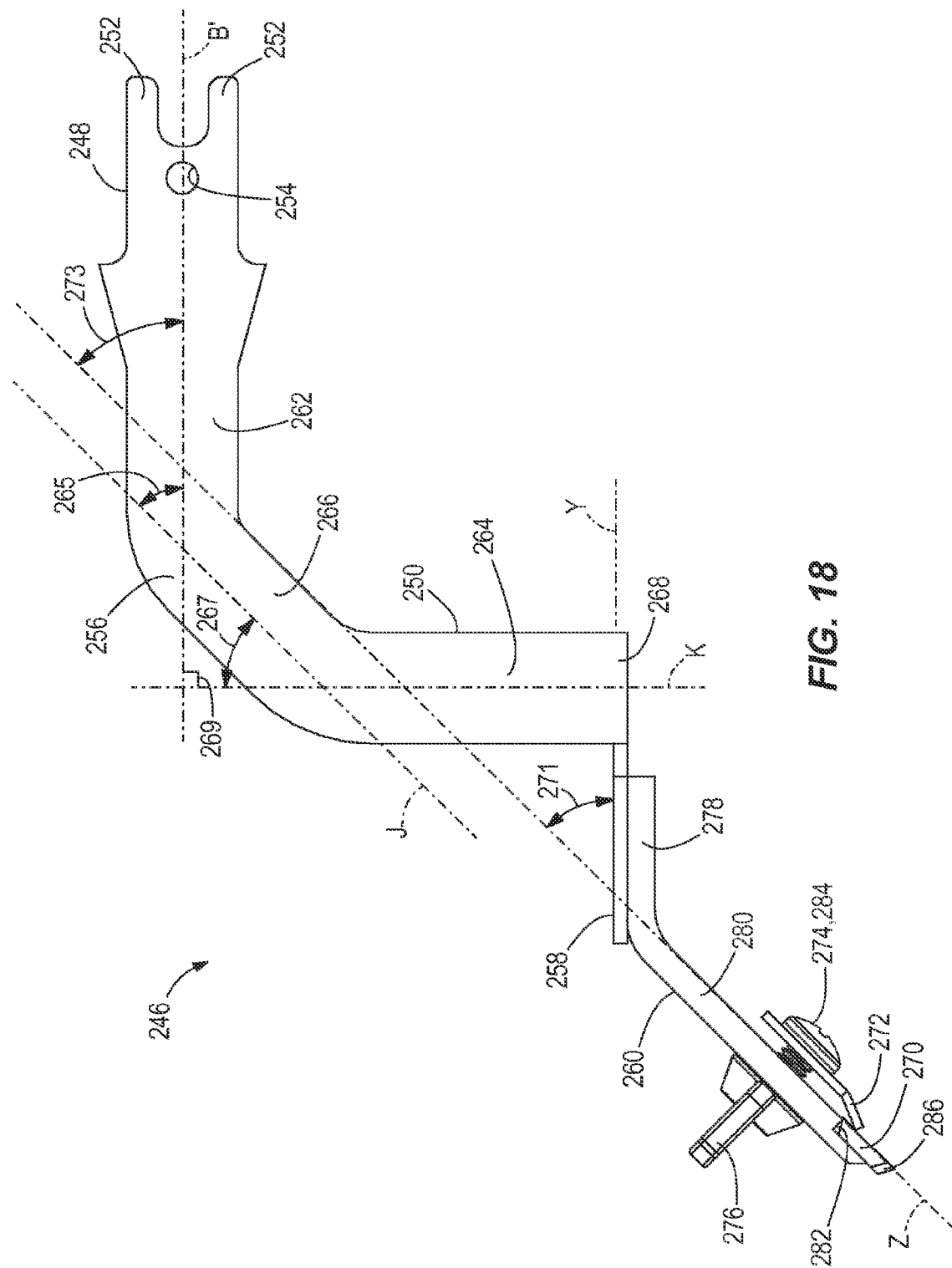
FIG. 18 is a side view of the accessory shown in FIG. 16.
Figure 19:
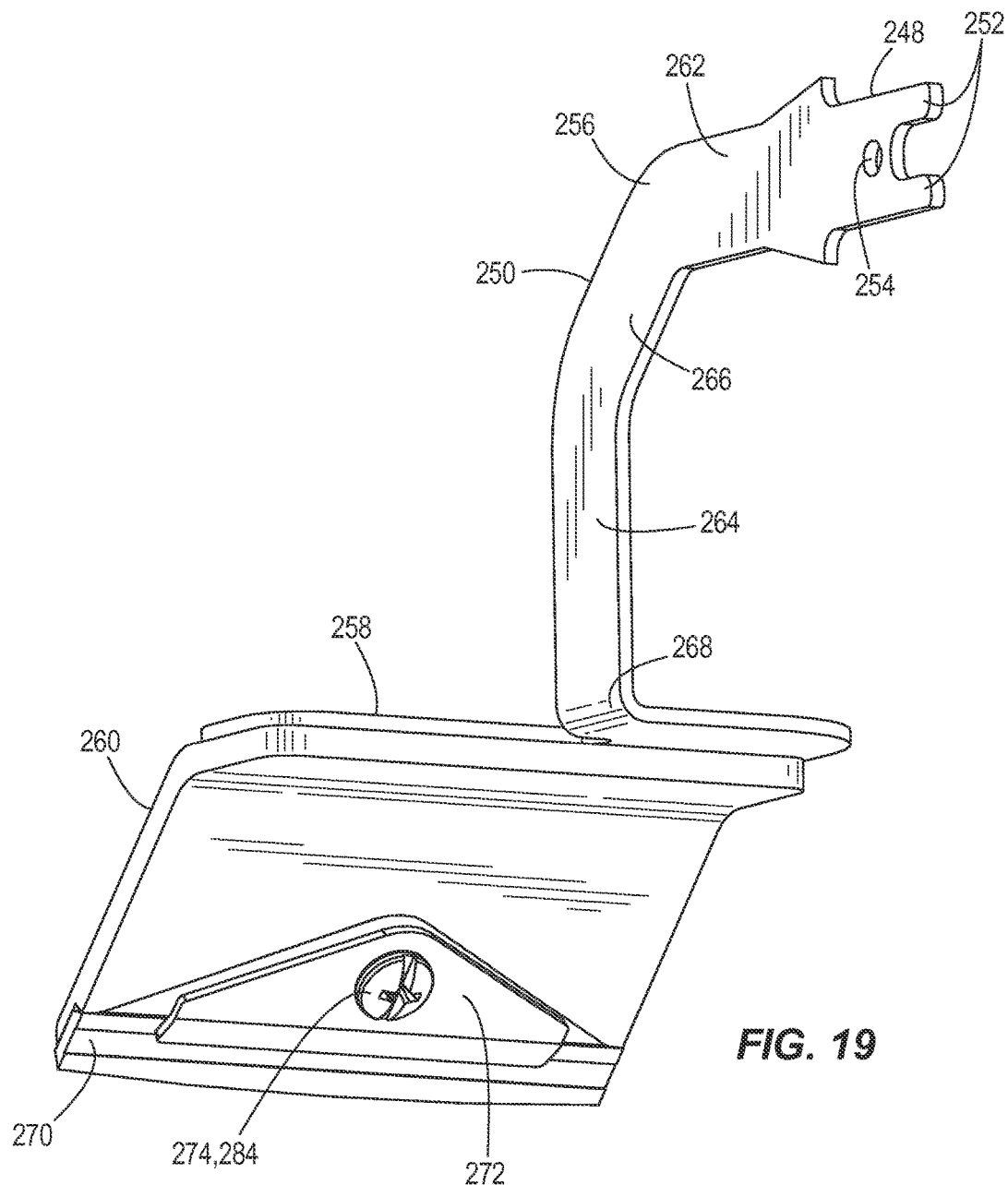
FIG. 19 is a rear perspective view of the accessory shown in FIG. 16

As illustrated in the side view of FIG. 18, the arm portion 256 includes a first portion 262, a second portion 264, and a third portion 266 extending between the first and second portions 262, 264. The first portion 262 extends from the attachment portion 248 along the longitudinal axis B. The third portion 266 extends between the first and second portions 262, 264 and defines a longitudinal axis J disposed at an included angle 265 with respect to the longitudinal axis B'. The angle 265 is preferably between about 0 degrees and about 90 degrees. More preferably, the angle 265 is between about 30 degrees and about 60 degrees. In the illustrated embodiment, and most preferably, the angle 265 is about 45 degrees. In the illustrated embodiment, the second portion 64 extends from the third portion 66 and defines a longitudinal axis K disposed at an included angle 267 with respect to the longitudinal axis K. The angle G is preferably between about 0 degrees and about 90 degrees. More preferably, the angle 267 is between about 30 degrees and about 60 degrees. In the illustrated embodiment, and most preferably, the angle 267 is about 45 degrees. The first and second portions 262, 264, and therefore the longitudinal axes B' and K, are preferably disposed at substantially a right angle (angle 269) with respect to each other. In some embodiments, the angle 269 is greater than or less than 90 degrees. In other embodiments, the first and second portions 262, 264 may be joined directly and the third portion 66 may be omitted.

Figure 17:
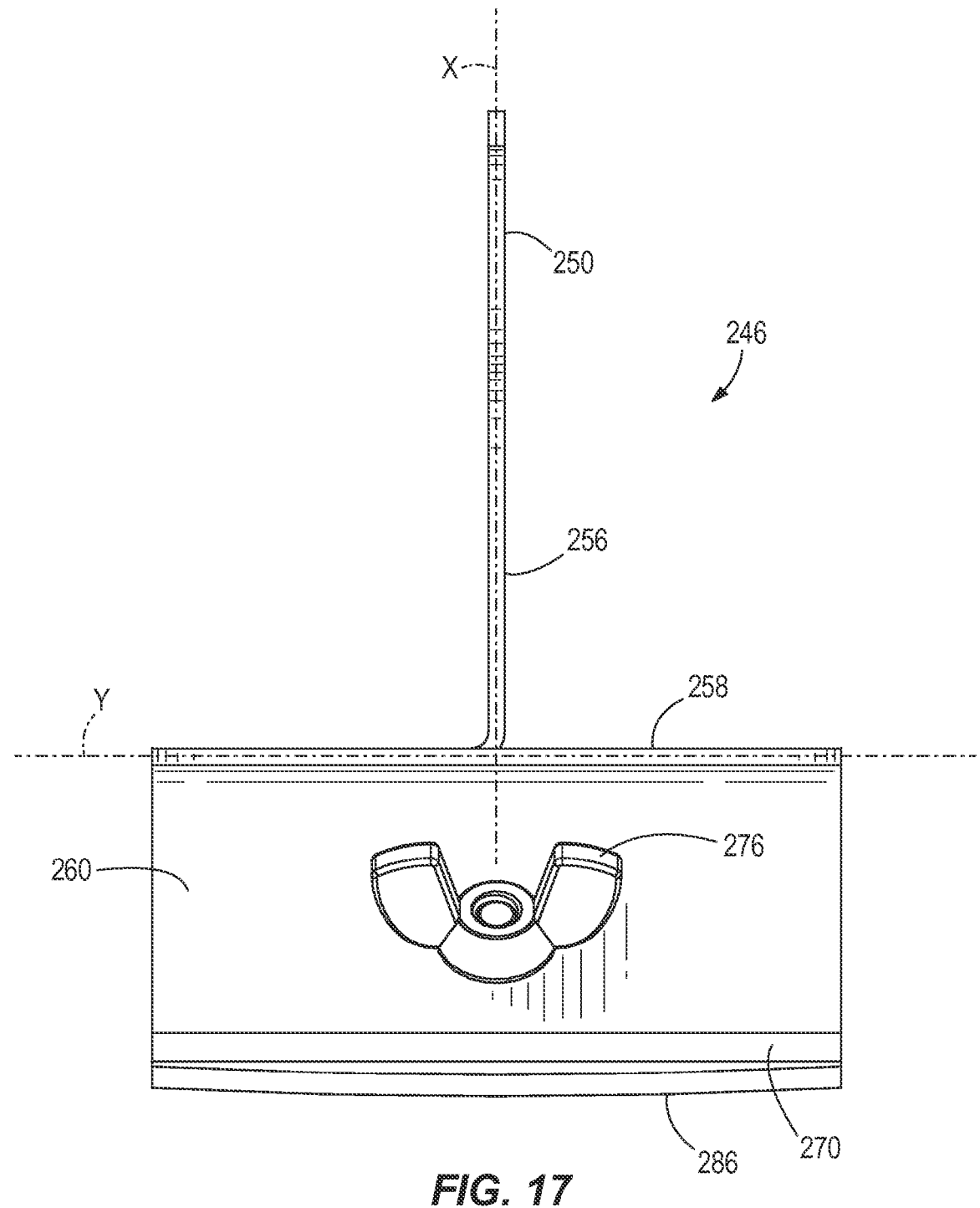
FIG. 17 is a front view of the accessory shown in FIG. 16.

In the illustrated embodiment, the arm portion 256 is formed as one piece with the transition portion 258 and includes a bend 268 between the arm portion 256 and the transition portion 258. As illustrated in FIG. 17, the transition portion 258 lies generally along a plane Y. The transition portion 258 is substantially perpendicular to the arm portion 256, i.e., the plane Y is substantially perpendicular to the plane X. In other embodiments, the transition portion 58 may be angled with respect to the arm portion greater than or less than 90 degrees.

The blade bracket 260 is coupled to the transition portion 258. In some embodiments, the blade bracket 260 is coupled to the transition portion 258 by way of fasteners, glue, adhesives, welding, soldering, riveting, and the like. In other embodiments, the blade bracket 260 may be formed as one piece with the transition portion 258. The blade bracket 260 includes a coupling portion 278 coupled to the transition portion 258 and a blade-receiving portion 280. The coupling portion 278 is substantially parallel to plane Y. The blade-receiving portion 280 extends from the coupling portion 278 along a plane Z (FIG. 18) at an included angle 271 of about 45 degrees with respect to the coupling portion 278 (i.e., the plane Y). Similarly, the blade-receiving portion 280 is disposed at an angle 273 with respect to the longitudinal axis B" of about 45 degrees. In other embodiments, the angles 271 and 273 may be between about 0 degrees and about 90 degrees. More preferably, the angles 271 and 273 are between about 30 degrees and about 60 degrees. Angles 271 and 273 are most preferably about 45 degrees, as illustrated.

Figure 20:
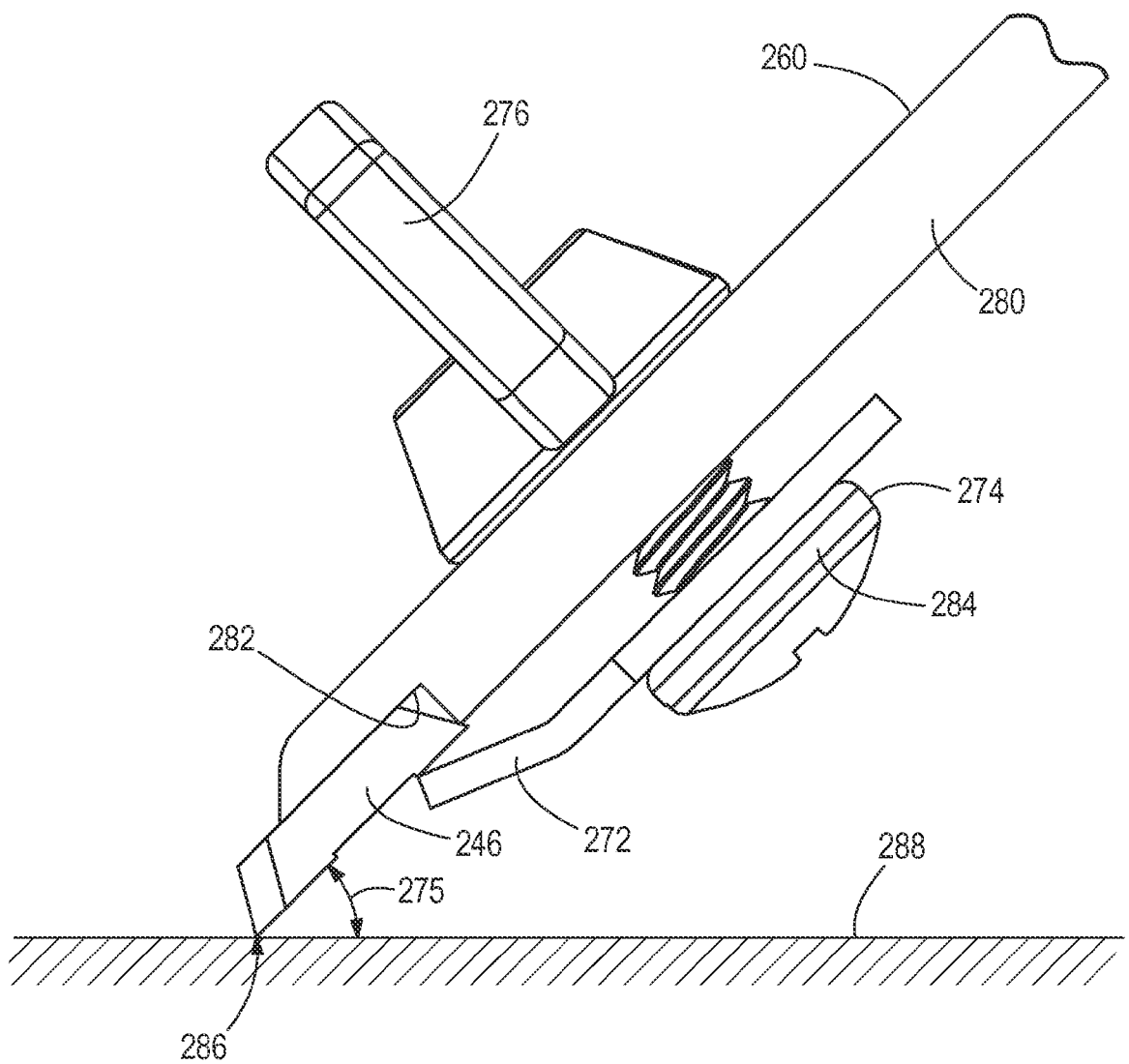
FIG. 20 is an enlarged view of a portion of the accessory shown in FIG. 18.

As is best illustrated in FIG. 20, a blade 270 is coupled to the blade-receiving portion 280 at a distal end of the blade bracket 260 opposite the transition portion 258. The blade 270 is received in a recess 282 at the distal end of the blade bracket 260. The blade 270 is coupled to the blade bracket 260 by way of a clamping member 272, a fastener 274 and a wing nut 276. The clamping member 272 is positioned adjacent to and abutting a head 284 of the fastener 274, and the blade 270 is sandwiched between the clamping member 272 and the blade bracket 260. A clamping force exerted by tightening the wing nut 276 on the fastener 274 secures the blade 270 to the blade bracket 260. The blade 270 includes a sharp edge 286 for scraping a work piece 288, such as a surface having paint. The sharp edge 286 is disposed generally perpendicular to the longitudinal axis A of reciprocation of the spindle 42, and similarly is disposed generally perpendicular to the longitudinal axis B' of the attachment portion 248. In the illustrated embodiment, the blade 270 is disposed at an included angle 275 with respect to the work piece 288 and, similarly, with respect to the longitudinal axis A of reciprocation of the reciprocating saw 10 and, similarly, with respect to the longitudinal axis B' of the attachment portion 248. The angle 275 is preferably between about 0 degrees and about 90 degrees and more preferably between about 30 degrees and about 60 degrees. Most preferably, the angle 275 is about 45 degrees, as illustrated. It is to be understood that various configurations may be employed in order to achieve holding the blade 270 at the angle 275 with the sharp edge 286 generally perpendicular to the longitudinal axes A and B', as described above. The invention is not limited to the exact configuration of the body 250 described above.

In operation, an operator attaches the attachment portion 248 of the accessory 246 to the blade clamp mechanism 12 for reciprocation with the spindle 42 of the reciprocating tool 10. The accessory 246 reciprocates generally parallel to the longitudinal axis A of the spindle 42, guiding the sharp edge 286 of the blade 270 back and forth along the surface of the work piece 288, for example, to scrape and remove paint from the surface of the work piece 288. The blade 270 may be removed and replaced by loosening the wing nut 276, removing the fastener 274 and the clamping member 272 and removing the blade 270. A new blade may be inserted, the fastener 274 passed through the clamping member 272 and tightened to the blade bracket 260 with the wing nut 276.

Figure 21:
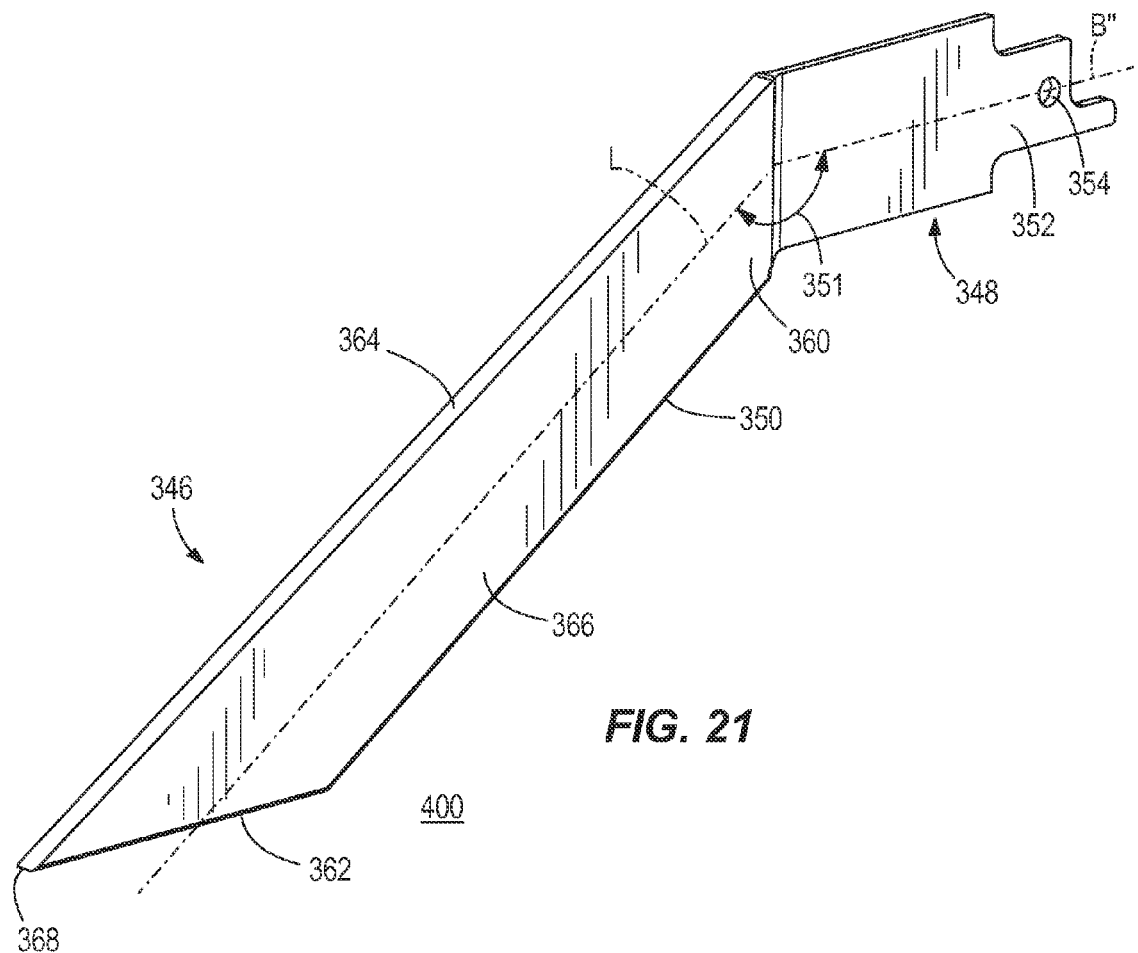
FIG. 21 is a perspective view of an accessory for a reciprocating saw according to another embodiment of the invention.
Figure 22:
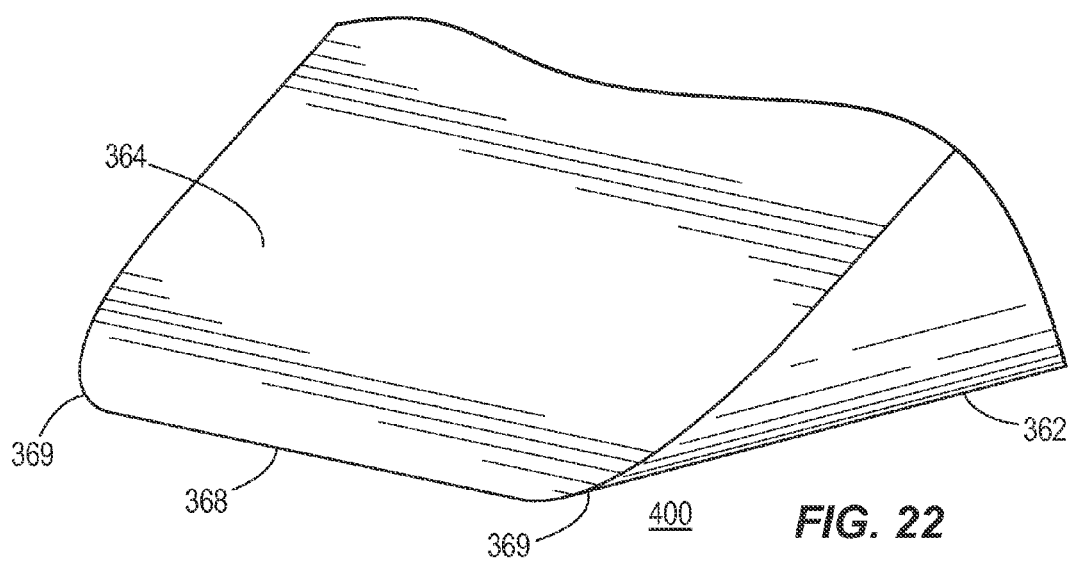
FIG. 22 is an enlarged view of a portion of the accessory.
Figure 23:
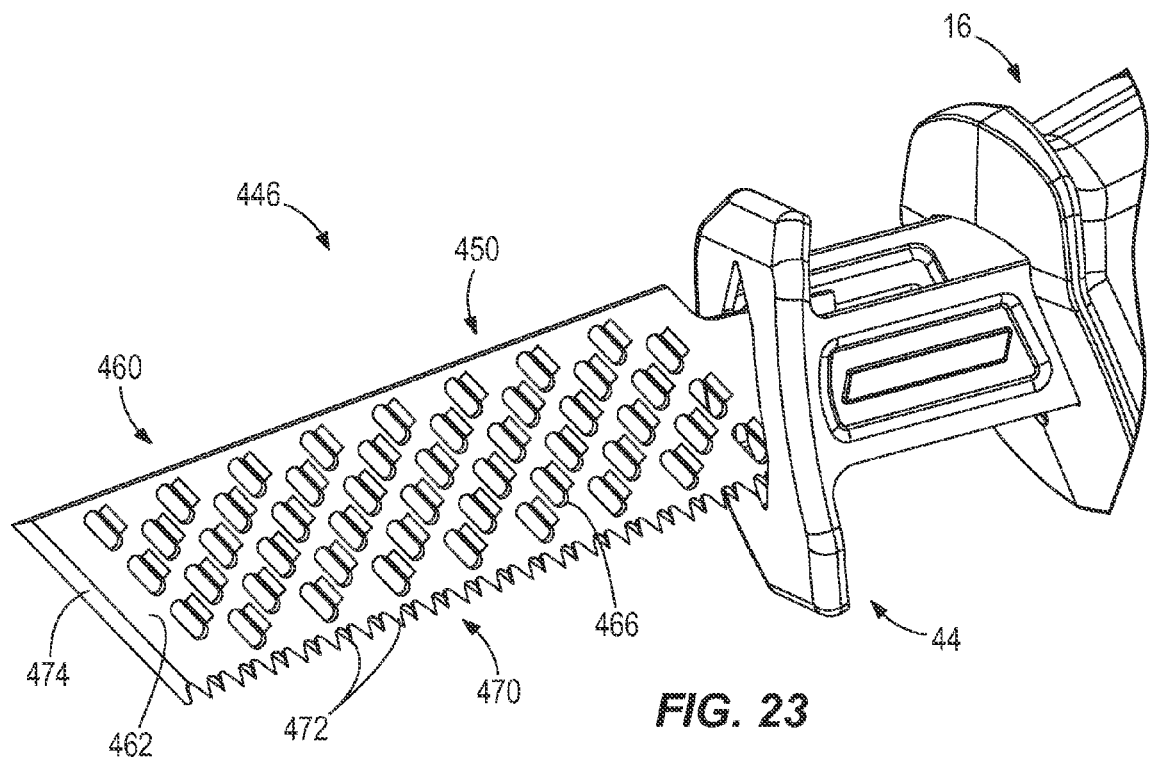
FIG. 23 is a perspective view of the reciprocating power tool shown in FIG. 1 and including a shoe and an accessory according to another embodiment of the invention.

FIGS. 21-22 illustrate an accessory 346 according to another embodiment of the invention. In the illustrated embodiment, the accessory 346 is a staple puller. The staple puller 346 includes an attachment portion 348 and a body 350 extending from the attachment portion 348. The attachment portion 348 defines a longitudinal axis B" of the reciprocating tool 10. The attachment portion 348 of the staple puller 346 is attached to the blade clamp mechanism 12. The longitudinal axis B" is substantially parallel to the longitudinal axis A.

The attachment portion 348 includes a tang 352 with an aperture 354. The tang 352 and the aperture 354 are configured to engage with the blade clamp mechanism 12 to securely and releasably couple the staple puller 346 to the reciprocating tool 10. In other embodiments, other types or configurations of attachment portions may be employed in order to suit the blade clamp mechanism 12 of the reciprocating tool 10.

The body 350 of the staple puller 346 has a generally trapezoidal shape and is angled downwards from the attachment portion 348 and the longitudinal axis B" along an axis L, as shown in FIG. 3. The body 350 is angled with respect to the attachment portion 348 at an angle B, which is between about 30 degrees and about 60 degrees, and preferably about 45 degrees in the illustrated embodiment. The body 350 includes a first end 360 coupled to the attachment portion 348 and a second, free end 362 opposite the first end 360, which during operation abuts a surface 400 from which the staple is to be removed. The surface 400 may be a floor, a workpiece, a wall, or any other surface with a staple lodged therein. The remainder of the periphery of the body 350 is formed by two parallel sides 364, 366 that connect the first end 360 to the second end 362.

As best shown in FIG. 22, an intersection of the sides 364, 366 and the second end 362 forms a wedge-shaped leading edge 368. The leading edge 368 removes staples by prying the staples embedded within the surface 400. The leading edge 368 includes rounded ends 369, which ease insertion of the puller 346 underneath staples. The leading edge 368 is sized and dimensioned to fit under conventional staples, such as siding, roof, or other heavy-duty staples; however, the dimensions of the leading edge 368 may be altered for other staple pulling applications.

During operation of the staple puller 346, the second end 362 reciprocates along the surface 400 so that the leading edge 368 wedges under a staple embedded in the surface 300. Reciprocation of the second end 362 causes the leading edge 368 to apply an upward force on the staple, as the side 364 travels underneath the staple, to pry the staple from the surface 300.

FIGS. 23-26 illustrate an accessory 446 according to one embodiment of the invention. The accessory 446 includes an attachment portion 448 and a body 450 extending from the attachment portion 448. The attachment portion 448 includes a tang 452 and an aperture 454, which are configured to engage with the blade clamp mechanism 12 to securely and releasably connect the accessory 446 to the reciprocating tool 10. In other embodiments, other types or configurations of attachment portions may be employed in order to suit the blade clamp mechanism 12 of the reciprocating tool 10.

The body 450 includes a top surface 460, a first side surface 462, a second side surface 464, and apertures or grooves 466 that extend between the two side surfaces 462, 464. The apertures 464 include teeth or projections 468 that project from the first side surface 462 thereby creating a grating or rasping surface. In the illustrated embodiment, the projections 468 are generally rectangular shaped and only project from the first side surface 462. In further embodiments, the projections could have other shapes and project from both side surfaces 462, 464. The dimensions of the body 450 and the orientation of the apertures 466 and projections 468 illustrated in FIGS. 23-26 are just one possible embodiment of the accessory 446, and in other embodiments, the apertures and projections may have any suitable orientation and the body may have other suitable dimensions.

The body 450 further includes a bottom surface 470 having cutting teeth 472. In the illustrated embodiment, alternating cutting teeth 472 on each side are beveled. However, in further embodiments, the cutting teeth may have any suitable cutting configuration. The body 450 also includes an angled end surface 474. The end surface 474 slants from the second side surface 464 to the first side surface 462 thereby creating a sharp edge that functions as a scraping blade. The sharp edge further includes a sharp point 475 designed to start a cut by puncture a working surface.

Figure 24:
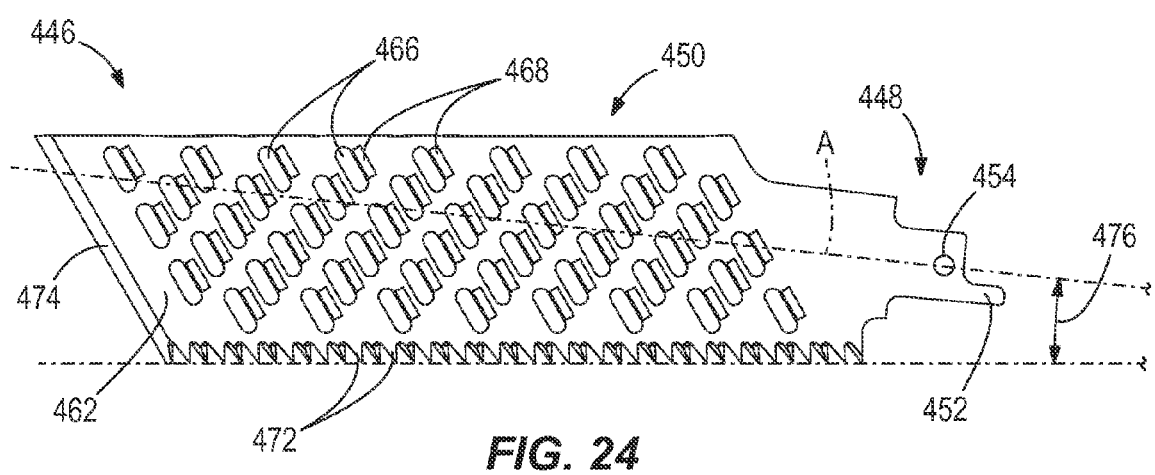
FIG. 24 is a side view of the accessory of FIG. 23.
Figure 25:
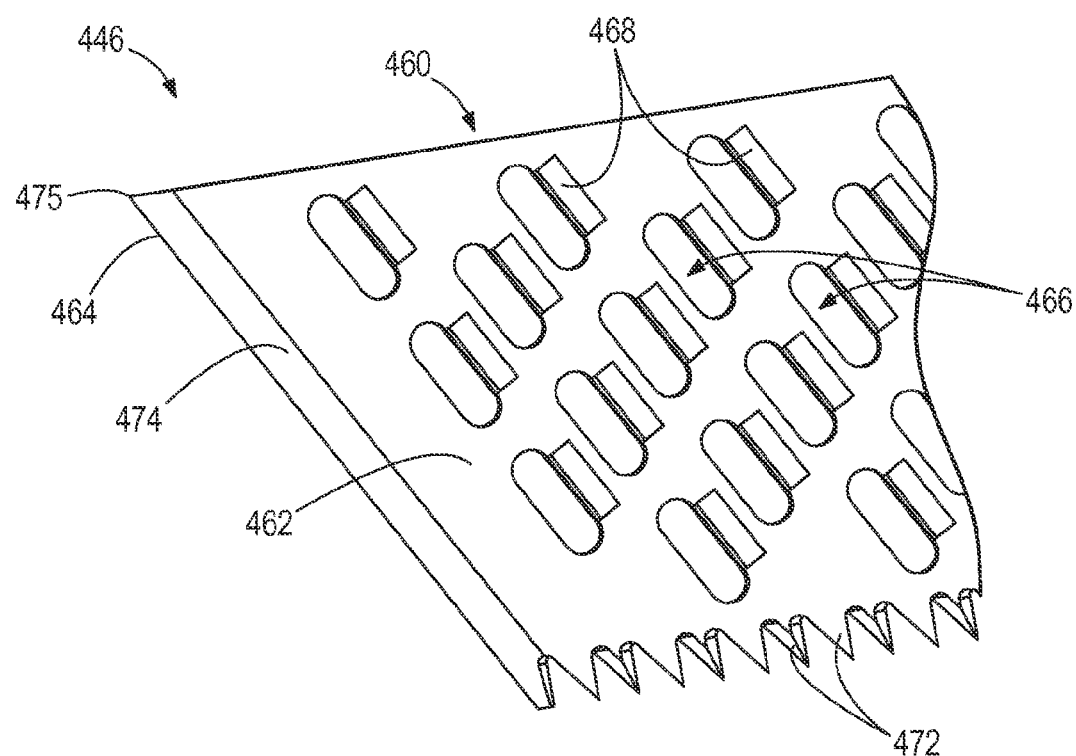
FIGS. 25 and 26 are detailed views of the accessory of FIG. 23.
Figure 26:
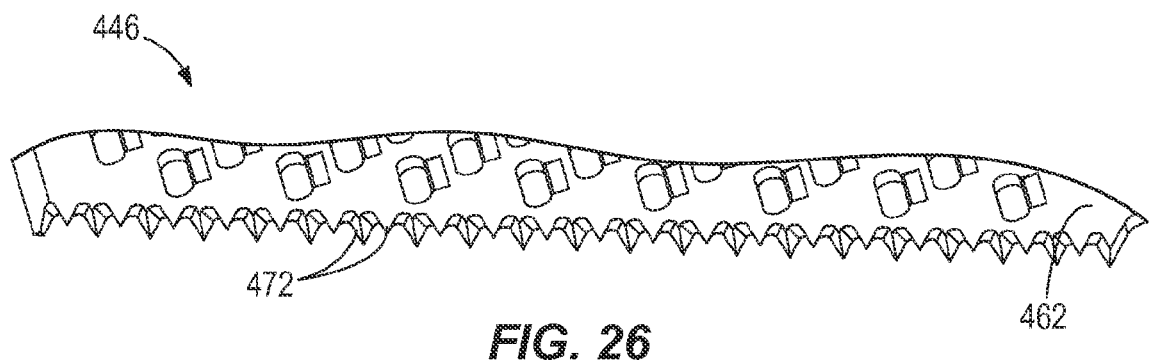

Further with respect to FIG. 24, the body 450 is oriented at an angle 476 with respect to the attachment portion 448 and the tang 452. Therefore, the body 450 reciprocates at the angle 476 relative to the axis of reciprocating motion A in order to perform a more aggressive cut. In the illustrated embodiment, the angle 376 is approximately 7.92°. However, in further embodiments the angle could range between approximately 0° and approximately 8°. Greater angles accommodate more aggressive cuts.

During operation of the accessory 446, the cutting teeth 472 reciprocate against a working surface thereby cutting into the working surface. Additionally, the rasping surface created by the apertures 466 and projections 468 on the first side surface 462, smoothes or expands an edge of the working surface. In some applications, cutting and smoothing or expanding the working surface may be accomplished simultaneously. Further, reciprocation of the end surface 474 allows the accessory to function as a scraping blade for removing a material from the working surface.

FIGS. 27-30 illustrate an accessory 546. The accessory 546 includes an attachment portion 548 and a body 550 extending from the attachment portion 548. The attachment portion 548 includes a tang 552 and an aperture 554. The tang 552 and the aperture 554 are configured to engage with the blade clamp mechanism 12 to securely and releasably connect the accessory 546 to the reciprocating tool 10. In other embodiments, other types or configurations of attachment portions may be employed in order to suit the blade clamp mechanism 12 of the reciprocating tool 10.

Figure 27:
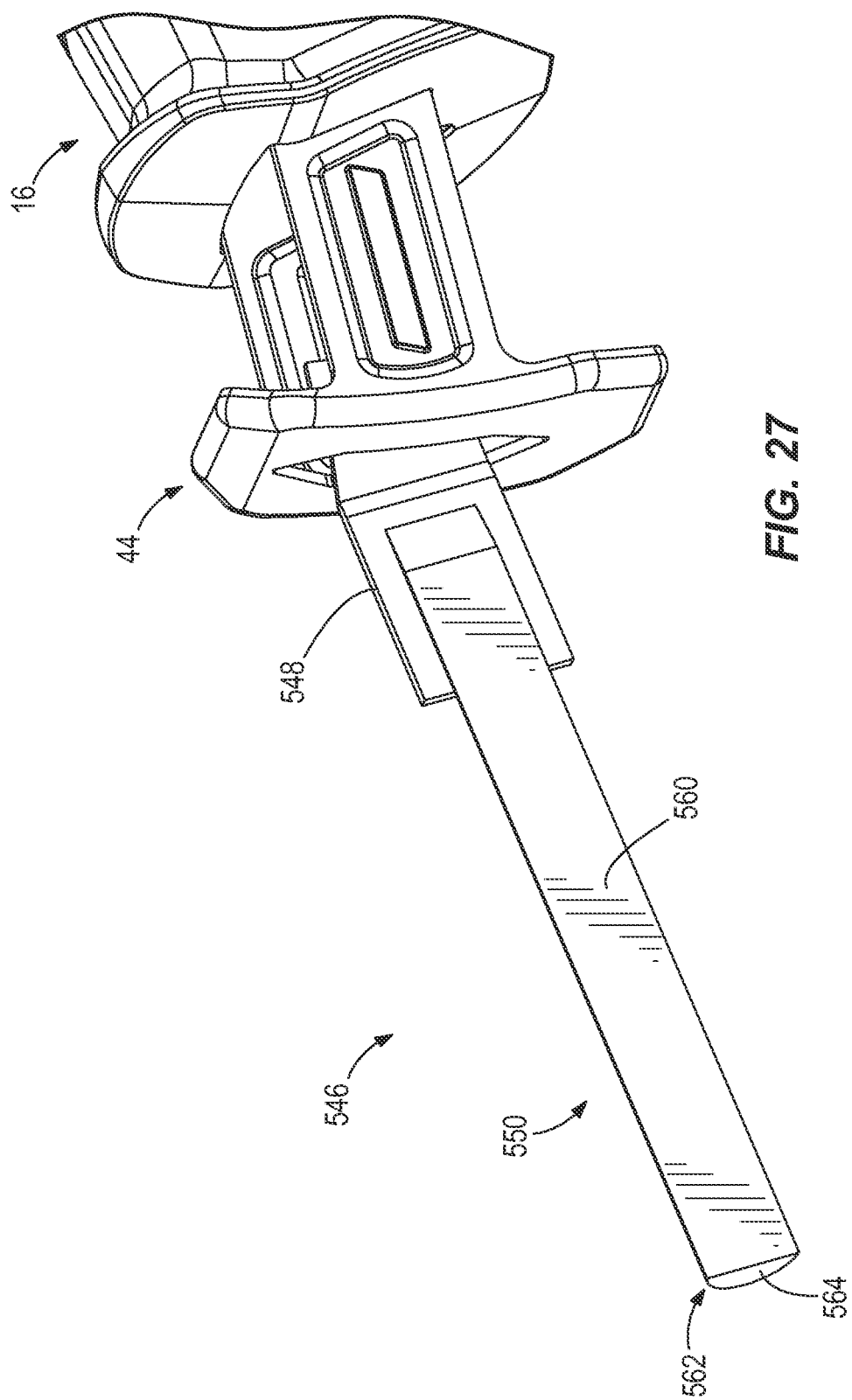
FIG. 27 is a perspective view of the reciprocating power tool shown in FIG. 1 and including a shoe and an accessory according to another embodiment of the invention.

Further with respect to FIG. 27, the body 550 according to one embodiment of the invention includes a flat surface 560, a rounded surface 562 opposite the flat surface 560, and a distal surface 564. In this embodiment, both the flat surface 560 and the rounded surface 562 include an abrasive surface. In further embodiments, either of the flat surface or the rounded surface could include an abrasive surface while the other remains smooth. The dimensions of the body 550 illustrated in FIG. 27 are just one possible embodiment of the accessory 546, and in other embodiments, the body has other suitable dimensions.

Figure 28:
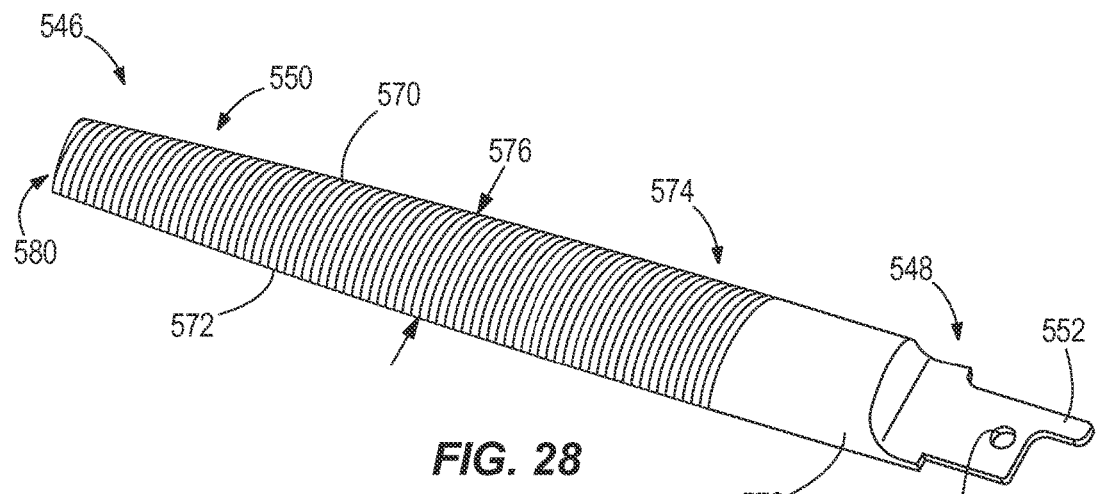
FIG. 28 is a perspective of an accessory according to another embodiment of the invention.

Referring to FIG. 28, the body 550 according to another embodiment of the invention includes a surface 570 having a rounded, abrasive portion 572 and a rounded, smooth portion 574. A diameter 576 of body 550 gradually decreases from a proximal end 578 to a distal end 580. In this embodiment, the body 550 includes a variable diameter that changes gradually and has both abrasive and smooth portions. However, in further embodiments the diameter could be constant or change more dramatically. Additional embodiments could also include smaller or larger abrasive portions with respect to the smooth portion. Still further embodiments may not include a smooth portion at all. In the illustrated embodiment, the surface 570 is rounded; however, further embodiments could be square, half-round or flat. The dimensions of the body 570 illustrated in FIG. 28 are just one possible embodiment of the accessory 546, and in other embodiments, the body has other suitable dimensions.

Figure 29:
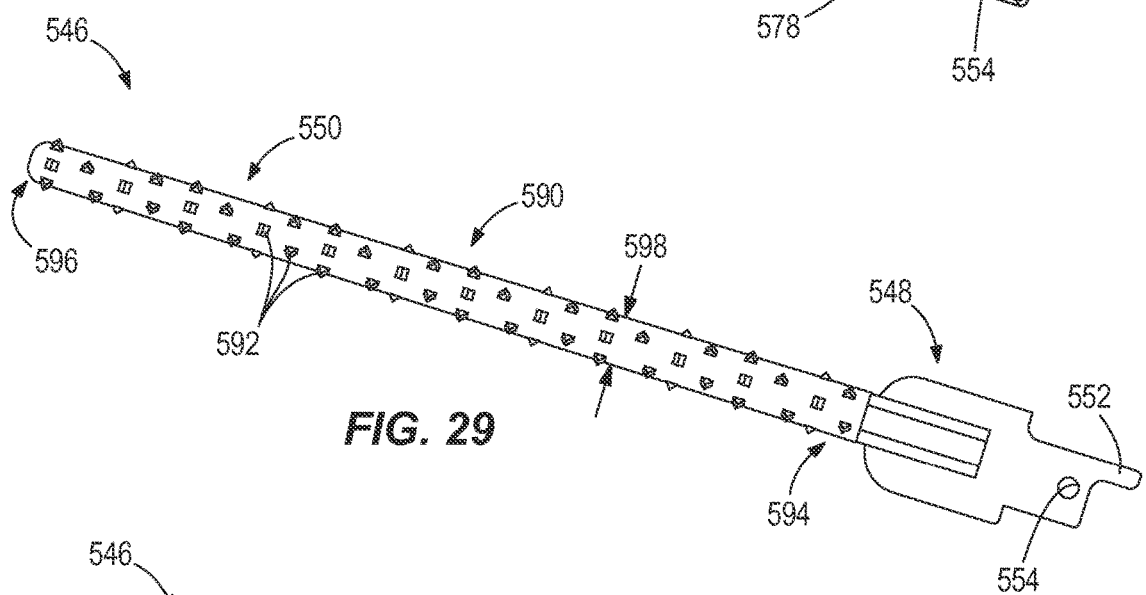
FIG. 29 is a perspective view of an accessory according to yet another embodiment of the invention.

With respect to FIG. 29, the body 550 according to yet another embodiment of the invention includes a surface 590 having projections or teeth 592. In the illustrated embodiment, the projections 592 are generally triangular. The shape and orientation of the projections 592 illustrated in FIG. 29 are just one possible embodiment of the accessory 546. Further embodiments could include projections with other orientations or shapes. The rounded surface 90 further includes a section at both the proximal and distal ends 594, 596 that does not include projections. A diameter 598 of body 550 gradually decreases from the proximal end 594 to the distal end 596. In this embodiment, the body 550 includes a variable diameter that changes gradually and has both abrasive and smooth portions. However, in further embodiments the diameter could be constant or change more dramatically. Additional embodiments could also include smaller or larger the smooth portions or no smooth portions at all. In the illustrated embodiment the surface 590 is rounded. However, further embodiments including projections could be square, half-round or flat. The dimensions of the body 550 illustrated in FIG. 29 are just one possible embodiment of the accessory 546, and in other embodiments, the body has other suitable dimensions.

Figure 30:
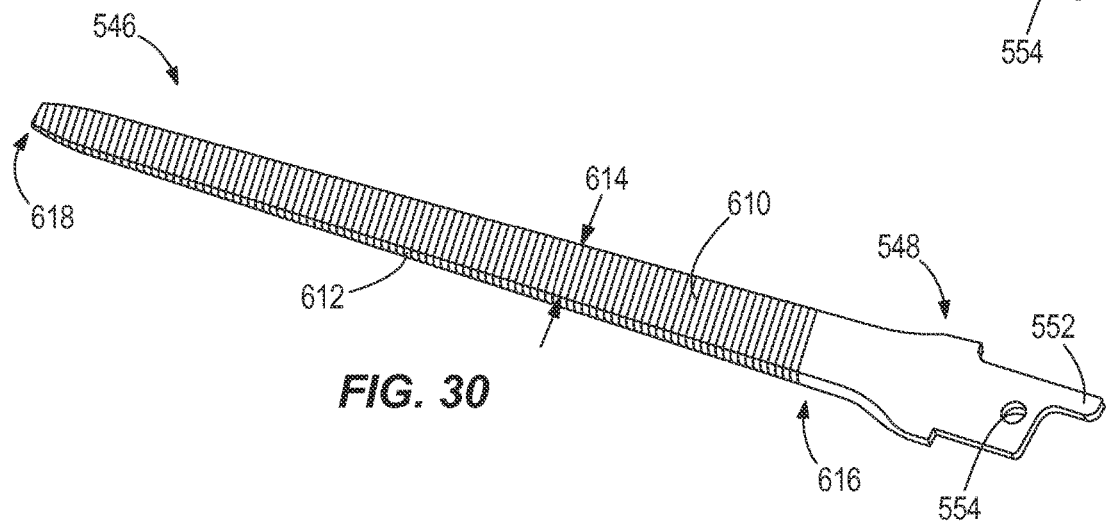
FIG. 30 is a perspective view of an accessory according to still another embodiment of the invention.

With respect to FIG. 30, the body 550 according to still another embodiment of the invention includes four sides (only two of which are shown) 610, 612. A width 614 of each side 610, 612 of body 550 gradually decreases from a proximal end 616 to a distal end 618. In the illustrated embodiment, each of the four sides includes an abrasive surface. Further embodiments could include one, two, or three abrasive surfaces with the remaining surfaces being smooth. In this embodiment, the body 550 includes four sides with variable width that change gradually; however, in further embodiments the width could be constant or change more dramatically. The dimensions of the body 350 illustrated in FIG. 30 are just one possible embodiment of the accessory 346, and in other embodiments, the body has other suitable dimensions.

During operation of the accessory 546, the body 550 reciprocates against a working surface thereby filling or smoothing the working surface. The body 550 may have various abrasive surface configurations for filing or smoothing unique working surfaces according to the embodiments described above.

Thus, the invention provides, among other things, an accessory attachable to a reciprocating saw for removing grout from a work piece. The invention also provides, among other things, various accessories for use with a reciprocating saw, such as a reciprocating accessory for cutting or shearing a material as a result of movement of the reciprocating blade against a blade that is fixed. Additionally, the invention provides an accessory attachable to a reciprocating saw having a sharp edge for scraping the surface of a work piece. The invention also provides a staple puller accessory for the removal of staples embedded within a surface. The invention provides further provides a reciprocating accessory for cutting, smoothing, expanding, scraping, and filing a working surface. Although the invention has been described in detail with reference to certain preferred embodiments, variations and modifications exist within the scope and spirit of one or more independent aspects of the invention as described.

What is claimed is:

1. A reciprocating power tool comprising:
   a housing supporting a motor having a drive shaft, the motor actuatable by a trigger;
   a blade clamp mechanism;
   a drive mechanism coupled to the motor for converting rotational motion of the drive shaft into reciprocating motion of the blade clamp mechanism; and
   an accessory including:
      an attachment portion configured to be coupled to the blade clamp mechanism;
      a body portion extending from the attachment portion;
      a grout rake movably coupled to the body portion at a hub, the grout rake including a plurality of cutter portions extending from the hub in different directions;
   wherein the grout rake is repositionable relative to the body portion at the hub between a first position and a second position, wherein in the first position one of the plurality of cutter portions is located in a working position for contacting a workpiece, and wherein in the second position another one of the plurality of cutter portions is located in the working position for contacting the workpiece.

2. The reciprocating power tool of claim 1, wherein at least two of the plurality of cutter portions includes a unique cutting width.

3. The reciprocating power tool of claim 2, wherein the grout rake includes an aperture for receiving a fastener, and wherein at least two of the plurality of cutter portions extend along a unique axis, each unique axis extending away from the aperture.

4. The reciprocating power tool of claim 1, wherein at least two of the plurality of cutter portions extend along a unique axis, each unique axis extending radially from a point.

5. The reciprocating power tool of claim 1, further comprising a first aperture in the grout rake and a second aperture in the body portion, the first and second apertures for receiving a fastener for removably securing the grout rake to the body portion.

6. The reciprocating power tool of claim 1, further comprising a fastener extending through a first aperture in the grout rake and a second aperture in the body portion for removably securing the grout rake to the body portion.

7. The reciprocating power tool of claim 1, wherein the plurality of cutter portions include:
   a first cutter portion including a substantially rounded tip, the first cutter portion extending from a point along a first axis; and
   a second cutter portion including a substantially rectangular-shaped tip having a width, the second cutter portion extending from the point along a second axis.

8. The reciprocating power tool of claim 7, wherein the width is a first width, and wherein the plurality of cutter portions further include:
   a third cutter portion including a substantially rectangular-shaped tip having a second width, the third cutter portion extending from the point along a third axis, the second width being different from the first width.

9. The reciprocating power tool of claim 8, wherein a first angle is defined between the first axis and the second axis, a second angle is defined between the second axis and the third axis, and a third angle is defined between the third axis and the first axis.

10. The reciprocating power tool of claim 9, wherein the first angle is about 120 degrees, the second angle is about 90 degrees, and the third angle is about 150 degrees.

11. The reciprocating power tool of claim 9, wherein the first, second, and third angles are substantially different.

12. The reciprocating power tool of claim 1, wherein the hub includes an aperture therethrough, the grout rake being repositionable by rotation about a center of the aperture between the first position and the second position.

13. The reciprocating power tool of claim 1, wherein the grout rake is repositionable by rotation between the first position and the second position.

14. The reciprocating power tool of claim 1, wherein the grout rake includes at least three cutter portions.

15. An accessory for use with a reciprocating power tool, the accessory comprising:
   an attachment portion;
   a body portion extending from the attachment portion; and
   a grout rake movably coupled to the body portion at a hub, the grout rake including a plurality of cutter portions extending from the hub in different directions;
   wherein the grout rake is repositionable relative to the body portion at the hub between a first position and a second position, wherein in the first position one of the plurality of cutter portions is located in a working position for contacting a workpiece, and wherein in the second position another one of the plurality of cutter portions is located in the working position for contacting the workpiece.

16. The accessory of claim 15, wherein at least two of the plurality of cutter portions includes a unique cutting width.

17. The reciprocating power tool of claim 15, wherein the grout rake includes an aperture for receiving a fastener, and wherein at least two of the plurality of cutter portions extend along a unique axis, each unique axis extending away from the aperture.

18. The reciprocating power tool of claim 17, wherein the grout rake is repositionable by rotation about a center of the aperture between the first position and the second position.

19. The reciprocating power tool of claim 15, wherein the grout rake is repositionable by rotation between the first position and the second position.

20. The accessory of claim 15, wherein at least two of the plurality of cutter portions extend along a unique axis, each unique axis extending radially from a point.

21. The accessory of claim 15, further comprising a first aperture in the grout rake and a second aperture in the body portion, the first and second apertures for receiving a fastener for removably securing the grout rake to the body portion.

22. The accessory of claim 15, wherein the grout rake includes at least three cutter portions.

23. The accessory of claim 15, wherein the plurality of cutter portions include:
   a first cutter portion including a substantially rounded tip, the first cutter portion extending from a point along a first axis; and
   a second cutter portion including a substantially rectangular-shaped tip having a width, the second cutter portion extending from the point along a second axis.

24. The accessory of claim 23, wherein the width is a first width, wherein the plurality of cutter portions further include:
   a third cutter portion including a substantially rectangular-shaped tip having a second width, the third cutter portion extending from the point along a third axis, the second width being different from the first width.

25. The accessory of claim 24, wherein a first angle is defined between the first axis and the second axis, a second angle is defined between the second axis and the third axis, and a third angle is defined between the third axis and the first axis.

26. The accessory of claim 25, wherein the first angle is about 120 degrees, the second angle is about 90 degrees, and the third angle is about 150 degrees.

27. The accessory of claim 25, wherein the first, second, and third angles are substantially different.

28. An accessory for use with a reciprocating power tool, the accessory comprising:
   an attachment portion;
   a body portion extending from the attachment portion; and
   a grout rake rotatably coupled to the body portion at a hub, the grout rake including a plurality of cutter portions extending in different directions;
   wherein the grout rake is rotatable relative to the body portion between a first position and a second position, wherein in the first position one of the plurality of cutter portions is located in a working position for contacting a workpiece, and wherein in the second position another one of the plurality of cutter portions is located in the working position for contacting the workpiece.

29. The accessory of claim 28, wherein at least two of the plurality of cutter portions includes a unique cutting width.

30. The reciprocating power tool of claim 28, wherein the grout rake includes an aperture for receiving the fastener, and wherein at least two of the plurality of cutter portions extend along a unique axis, each unique axis extending away from the aperture.

31. The reciprocating power tool of claim 30, wherein the grout rake is rotatable about a center of the aperture between the first position and the second position.

32. The accessory of claim 28, wherein at least two of the plurality of cutter portions extend along a unique axis, each unique axis extending radially from a point.

33. The accessory of claim 28, further comprising a first aperture in the grout rake and a second aperture in the body portion, the first and second apertures for receiving the fastener for removably securing the grout rake to the body portion.

34. The accessory of claim 28, wherein the grout rake includes at least three cutter portions.

35. The accessory of claim 28, wherein the plurality of cutter portions include:

a first cutter portion including a substantially rounded tip, the first cutter portion extending from a point along a first axis; and a second cutter portion including a substantially rectangular-shaped tip having a width, the second cutter portion extending from the point along a second axis.

36. The accessory of claim 35, wherein the width is a first width, wherein the plurality of cutter portions further include:

a third cutter portion including a substantially rectangular-shaped tip having a second width, the third cutter portion extending from the point along a third axis, the second width being different from the first width.

37. The accessory of claim 36, wherein a first angle is defined between the first axis and the second axis, a second angle is defined between the second axis and the third axis, and a third angle is defined between the third axis and the first axis.

38. The accessory of claim 37, wherein the first angle is about 120 degrees, the second angle is about 90 degrees, and the third angle is about 150 degrees.

39. The accessory of claim 37, wherein the first, second, and third angles are substantially different.

* * * * *